United States Patent
Silvers et al.

(10) Patent No.: US 7,042,902 B2
(45) Date of Patent: May 9, 2006

(54) TECHNIQUES FOR COMMUNICATING INFORMATION USING PRIME-FREQUENCY WAVEFORM MAPPING

(75) Inventors: John Leroy Silvers, Miami, FL (US);
Maarten Boasson, Borculo (NL);
Pentti Kouri, New York, NY (US);
Erik Boasson, Borculo (NL)

(73) Assignee: Bandwidth Technology Corp., New York, NY (US)

( * ) Notice: Subject to any disclaimer, the term of this patent is extended or adjusted under 35 U.S.C. 154(b) by 448 days.

(21) Appl. No.: 10/215,806

(22) Filed: Aug. 8, 2002

(65) Prior Publication Data

US 2002/0191534 A1    Dec. 19, 2002

Related U.S. Application Data

(63) Continuation-in-part of application No. 10/022,333, filed on Dec. 20, 2001, which is a continuation of application No. 09/120,448, filed on Jul. 22, 1998, now Pat. No. 6,404,779.

(60) Provisional application No. 60/061,335, filed on Oct. 7, 1997.

(51) Int. Cl.
*H04J 3/02* (2006.01)

(52) U.S. Cl. ...................... 370/463; 370/537

(58) Field of Classification Search ............... 370/203, 370/204, 205, 208, 210, 463, 480, 482; 708/400, 708/403, 404, 405
See application file for complete search history.

(56) References Cited

U.S. PATENT DOCUMENTS 6,341,247 B1 * 1/2002 Hreha et al. ................. 701/3

* cited by examiner

*Primary Examiner*—Kwang Bin Yao
(74) *Attorney, Agent, or Firm*—Steven R. Bartholomew; David D. Lowry

(57) ABSTRACT

Systems and methods for efficiently conveying one or more broadband communication channels over a transmission medium. Communication is effected by transforming an incoming digital bit stream into a prime frequency information stream that includes a plurality of prime frequency components. This transformation can be accomplished through the use of a plurality of mathematical basis functions. The prime frequency information stream is then transmitted over the transmission medium. More particularly, digital bit streams carried on one or more incoming channels are in the form of binary "on" and "off" bits. These digital bits are converted into a plurality of prime frequency components which together comprise a prime frequency information stream. The conversion process maps each of respective incoming digital bits to a corresponding one of a group of orthogonal basis functions.

47 Claims, 16 Drawing Sheets

TECHNIQUES FOR COMMUNICATING INFORMATION USING PRIME-FREQUENCY WAVEFORM MAPPING

RELATED APPLICATION

This application is a Continuation-In-Part of patent application Ser. No. 10/022,333, filed on Dec. 20, 2001, which is a Continuation of patent application Ser. No. 09/120,448, filed on Jul. 22, 1998 now U.S. Pat. No. 6,404,779, the disclosures of which are incorporated by reference herein. patent application Ser. No. 09/120,448 is based upon Provisional Patent Application Serial No. 60/061,335, filed on Oct. 7, 1997, the disclosure of which is incorporated by reference herein.

BACKGROUND OF THE INVENTION

1. Field of the Invention

This invention relates generally to communications techniques, and more particularly, to systems and methods for increasing the effective information throughput of a transmission medium.

2. Description of Background Art

At one time, the Internet was primarily the domain of educators, scientists, military personnel, and technophiles. Web pages were utilitarian and simplistic by present-day standards. Many offered text-based information, or provided relatively simple graphical interfaces. Although expensive, elaborate equipment was initially required to access the Internet, this hardware was purchased by large corporations or at governmental expense. By and large, the general consuming public did not have the means, inclination, or desire to access the Internet. But this has all changed.

Throughout the years, the Internet has enjoyed an ever-expanding audience. At present, it is something of a rarity to find a residential premises in the United States that does not have Internet access. A modem-equipped personal computer is almost as ubiquitous as a refrigerator, microwave oven, or VCR (video cassette recorder). In the case of refrigerators, widespread usage does not pose an insurmountable technical hurdle, as the public utility company must merely increase its power generation capacity to keep up with the increased demand. However, in the case of the Internet, increased usage poses problems that are not so readily solved. Hundreds of thousands of individuals attempt to access the Internet every day. But they are not satisfied with text-based web pages or simplistic graphical interfaces—they would like to view real-time moving video images, listen to full-bandwidth audio, and download large files which may be many Megabytes in length. For example, a user may wish to download the contents of an entire 650-MB CD.

Given the types of information that Internet users are presently accessing, heavy demands are placed on the bandwidth capacity of the user's Internet connection. 20 Hz–20 KHz stereo audio requires a bandwidth on the order of 176,400 bytes per second for CD-quality audio. Consider the amount of information that must be transmitted if full-motion color video is to be sent in real time. A screen has 525 lines (pursuant to the North American Television Standards Committee, often referred to as NTSC). There are up to 800 pixels (points) on each line. A pixel may be stored as a 24-bit value. To transmit in real time, at least 30 images (frames) should be sent every second. This adds up to a grand total of 302,400,000 bits of information to be transmitted every second.

Telephone lines are required to carry voice information at roughly 2400 bps. A single ISDN line can carry information at 64 Kbps. So, consider how many telephone lines would be required to carry the amount of information in a full-motion video transmission. In most situations, and certainly for the typical residential consumer, the use of multiple telephone lines would be impractical.

In view of the aforementioned limitations, various video compression schemes have been developed. A first level of compression uses a single 64-kbps ISDN line to provide a grainy, choppy, and "jerky" image which could be used for non-critical videoconferencing applications. However, many users consider these images to be of unacceptably low quality.

Moving on to the next level, group video conferencing systems compress the video signal to a value within the range of approximately 128 Kbps to 2 Mbps. By way of example, 384 Kbps provides reasonable picture quality for use in many educational environments. Digital video broadcasting uses rates in the range of 2–6 Mbps. Image quality is greatly increased over the previous compression levels, but a very "broadband" connection is required. The recently-promulgated HDTV standards consume even more bandwidth, as they require rates of 25–45 Mbps.

With the foregoing video data rates in mind, consider that most residential users access the Internet over a conventional subscriber loop to the local telephone company central office. Using state-of-the-art modem technology, this subscriber loop provides a bandwidth no greater than 56 Kilobits per second and, in many cases, a lot less.

Although expanded-bandwidth solutions exist on paper, practical implementations of solutions have not yet been realized. As a practical matter, when a residential customer orders a "broadband" service such as ISDN (Integrated Services Digital Network) or DSL (Digital Subscriber Line) from the local telephone company, it is often difficult or impossible to obtain adequate performance. Even if the various installation obstacles are eventually overcome, the monthly fees associated with an ISDN or DSL connection are cost-prohibitive for many customers.

Cable modems represent another broadband alternative for Internet access. Nonetheless, telephone service is generally regarded as a basic necessity, present in virtually every household throughout the United States, whereas cable service is considered to be more of a luxury or non-essential item. Moreover, many residential premises have active and working telephone jacks installed throughout, whereas activated cable jacks may not be present in the vicinity of the computer room. Even if the customer pays the cable company to install an additional jack, this still restricts Internet access to one or two locations. Moreover, as in the case of DSL and ISDN, the subscription charge for Internet access via a cable modem is cost-prohibitive for many customers.

What is needed is an improved method for accessing the Internet over an ubiquitous, inexpensive, widely-available communications link. Such a method should not require the installation of additional wiring to a residential premises and, ideally, should operate over presently-existing communication paths. One possible candidate for such a communications path is the existing public switched telephone network (PSTN).

PSTN: As the public switched telephone network evolved, copper wire pairs were utilized in a manner such that a single pair would carry only one voice message at a time. Communications companies soon realized that, in order to enlarge their message-carrying capacity, they would have to devise ways to transmit several messages simultaneously over a single wire pair, because the cost of installing additional wires to accommodate increased demand was high. Companies would have a competitive advantage if they could reduce costs by putting more and more information over a single wire pair. Over time, discoveries in transmission techniques enabled more than one message to be transmitted per wire pair, thereby paving the way for the telephone industry to become a viable commercial enterprise.

The challenge of maximizing effective bandwidth and increasing line capacity existed from the very beginning of telecommunications technology, and is still with us today. Presently, telecommunications networks are the primary mechanism for conveying voice and data traffic from one location to another. But existing telecommunication networks cannot handle the ever-increasing demand for transmission capacity. Rising population, lower telephone rates, and increased data traffic over the Internet, all underscore the need to increase network capacity. As more and more bandwidth becomes available, higher bandwidth applications are quickly developed, such as higher-resolution web pages and video-on-demand, which once again heightens the demand for increased bandwidth and/or improved information throughput.

One way to satisfy an increasing demand for bandwidth is by installing additional transmission lines or by placing additional satellites in the sky. Both solutions are expensive and dictate substantial investments. Yet, even satellite solutions have limitations, for there is only a limited number of satellites that can be placed in geostationary orbit in the Clarke belt. The Clarke belt is the only location where satellites, when viewed from the Earth's surface, remain substantially stationary, thereby permitting the use of fix-mounted dish antennas. Moreover, owing to the fact that satellite communications operates at the speed of light, the substantial distance between satellites and earth stations introduces a perceptible propagation delay into the signal path. This delay can be disturbing, annoying, and frustrating in the case of real-time interactive applications. On the other hand, terrestrial-based wireless systems operate over the public radio spectrum, which, by its very nature, is a limited resource. Bandwidth utilization and compression methods maybe employed to expand the capacity of wireless systems, but these methods are not sufficient to meet demand in heavily-populated areas. To remain competitive, network service providers must endeavor to preserve the functionality of their existing networks, yet still be able to accommodate the increasing bandwidth demand to handle voice, data, and video transmission.

In conventional analog transmission, acoustical energy from a speaker's voice vibrates a diaphragm or crystal in a microphone. The crystal or diaphragm is used to transform these mechanical vibrations into an electrical signal. The amplitude of this electrical signal varies in a manner analagous to the acoustical vibrations of the speaker's voice. This electrical signal can be amplified and transmitted over a wire pair to a receiver at a remote location. At the receiver, the electrical signal is used to energize an electromagnet, actuating a diaphragm in proximity to the magnet, whereby the diaphragm vibrates to reproduce the original voice. Digital transmission adds several steps to this transformation, starting with an electrical signal from a microphone. This signal has an amplitude which could vary thousands of times per second. These measurements are encoded as voltage or amplitude levels which represent numbers. In the case of binary encoding schemes, the numbers consist of "0's" and "1's".

Unlike analog transmission which conveys audio information as a continuous waveform, in digital transmission, numbers are transmitted in representational encoding schemes. Digits or bits may be transmitted singly, as discrete, on-off or zero/non-zero current pulses, or in groups as simultaneous pulses at different frequencies. At the receiving end, the bit stream is interpreted and the numbers reconstituted to modulate a current which drives a speaker. This method is "digital" because it entails conversion of an analog signal to numbers, and the transmission of digits in symbolic form.

Compression: There are several known methods which provide for the transmission of information while reducing the overall bandwidth requirements. The most widely employed compression method uses mathematical algorithms and dictionary tables to reduce the number of digits needed to represent a given amount of information. As a consequence of the reduced number of digits that need to be transmitted, bandwidth requirements are correspondingly reduced. In practice, compression may be achieved by building a predictive model of a signal waveform, removing unnecessary elements, and reconstructing the waveform from the remaining elements.

When converting an analog signal into digital form, it is necessary for the digitized signal to contain sufficient information so as to enable a subsequent reconstruction of the analog signal. In order to properly reconstruct the analog signal, one must implement at least twice as many measurements (samples per second), as the highest frequency component in the signal. This requirement is oftentimes referred to as the Nyquist Criterion. The human voice generates sound frequencies in an approximate range of 20 to 4,000 Hz. Hence, a digital voice circuit, accepting an input in the range of 0–4,000 Hz, must sample this signal 8,000 times per second. In practice, the PSTN represents each sample using 7 bits of data plus a sign bit, for a total of 8 bits. A single voice circuit, referred to as DS0, "digital signal level zero", carries 64,000 (8,000×8) bits of data.

Compression methods are based upon reducing the number of bits required to convey a human voice or other data transmission. Currently-utilized compression algorithms can produce acceptable voice quality using less than 64 kbs by eliminating frequencies not necessary for voice intelligibility, particularly those below 300 Hz and those above 3,300 Hz, and possibly by emphasizing frequencies in the 1,000-Hz range that carry most of the voice energy. Unfortunately, some compression methods are carefully tailored for voice transmission applications, and tend to drop an excessive amount of information in the case of data or other non-voice signals. These compression methods cause problems when utilized in conjunction with high-speed tonal data transmission schemes employed by modems and faxes. In any event, currently-employed compression algorithms and equipment are able to transmit acceptable voice quality with a compression ratio of 8:1, using 8,000 bps per channel.

Using the foregoing compression methods, one channel can convey eight voice conversations or eight fax transmission over a line that originally was able to carry only one voice conversation. Higher compression methods which transmit voice and data over a circuit using less than 8,000 bps, suffer from increasing degradation of voice quality and "loss," whereby at the receiving end of the line the voice (in its original form) is not heard clearly and distinctly.

Although new methods and algorithms may be employed to allow for clear voice transmission using less than 8,000 bps, there are appreciable limitations to these methods. All compression methods using algorithms suffer from greater and greater "loss" as compression ratios increase. Fax and video transmission are more sensitive to bandwidth degradations than voice and, hence, are more limited in their acceptable compression ratios.

While the main advantage of digital compression is that it increases network efficiency, in some cases, it can reduce efficiency. For example, if the amount of time required by a computer to compress and decompress data is relatively lengthy, this can reduce efficiency. Multiplexing: One of the most widely-utilized data transmission protocols is known as "T1". T1 uses a form of multiplexing in which 24 voice or data channels are multiplexed over a four-wire cable (2 wires for transmit, and two wires for receive). Pursuant to the Nyquist Criterion, a voice channel must be sampled at a rate of approximately 8 KHz so as to permit the rendering of a clear representation of the sampled signal. In other words, one 8-bit sample must be taken every 125 microseconds. Since 24 individual channels must be read for each frame, in addition to a framing bit, the system must transmit 193 bits in 125 microseconds. At this rate, T1 must send or receive data at ($193/125\times10^{-6}$), or 1,544,000 bits per second. Therefore, the total bandwidth capacity of T1 is 1.544 Mbps. Compression methods are used in conjunction with T1 and other transmission protocols to maximize bandwidth. Common compression systems, using a ratio of 8:1, can carry 192 simultaneous voice or data channels (24×8) over a T1 line. Conversations or digital information carried on each of a plurality of T1 lines or channels is rendered unique, and is then transmitted with other T1 channels over a common transmission medium.

Another technique, FDM (Frequency Division Multiplexing), has been employed by phone companies to render each of a plurality of voice channels unique. These voice channels are then carried over a single transmission medium, which is typically a twisted wire pair. Pursuant to one illustrative implementation of FDM, each of a respective 24 voice and/or data channels are assigned to a corresponding frequency band. For example, line 1 is assigned to a frequency band of 0 Hz–4,000 Hz, line 2 is assigned to a frequency band of 4,000 Hz–8,000 Hz band, and so on. This method is best suited for analog signals which are subject to degradation and noise interference.

Other illustrative multiplexing techniques are Time Division Multiplexing (TDM) and Statistical Multiplexing (STDM), often called "packet switching." Pursuant to TDM, each of 24 channels (or lines) are rendered distinct by assigning each channel to a particular, non-overlapping time slot. Frames of 24 time slots are transmitted, in which Channel 1 is allocated the first time slot in the frame, Channel 2 is allocated the second time slot, and so on. STDM works in a similar manner to TDM, assigning channels on the basis of time division. But STDM takes advantage of statistical fluctuations, and instead of automatically assigning each channel to a time slot, STDM assigns only active channels to time slots. Hence, instead of transmitting channels in sequential order (1, 2, 3, 4, 5, 6) as in TDM, STDM only assigns time slots to channels that are being used, e.g., 1, 6, 3, 5, 6, 5, 3, etc. In general, STDM provides more efficient bandwidth utilization than TDM.

OBJECTS AND SUMMARY OF THE INVENTION

In view of the foregoing deficiencies, a primary object of the invention is to provide techniques for increasing the effective data throughput of a communications link which may include any of a wired transmission medium, a wireless transmission link, a satellite link, a fiber optic communication network, and various combinations thereof.

More particularly, an object of this invention is to provide systems and methods in which the effective bandwidth capacity of a transmission medium is enhanced by encoding a digital signal using prime frequency components.

A further object of the invention is to reduce potential interference on the transmission medium by using at least a first and a second prime frequency component, so as to distinguish a first portion of data from a second portion of data. Since no prime number is divisible by any other number, the prime number frequency components assigned to respective portions of data are not harmonically related. Accordingly, interference or cross-talk is substantially avoided, even though a multiplicity of prime frequency components are simultaneously conveyed over the transmission medium.

Briefly stated, these and other objects of the invention are attained in the form of systems and methods for enhancing the effective data throughput of a communications link. Data throughput is enhanced by transforming an incoming digital bit stream into a prime frequency information stream that includes a plurality of prime frequency components. This transformation is accomplished through the use of a predefined and deterministic mapping of symbols in the incoming digital bit stream onto a set of predefined signals. The set of predefined signals could, but need not, be characterized by a plurality of mathematical basis functions. In any case, the frequency (and, hence, time) domains are partitioned using prime numbers, so that the lack of a common divisor in frequency enhances the possibilities for separating various frequency components. The prime frequency information stream is then transmitted over the communications link.

Although the techniques of the present invention are applicable to binary, ternary, quaternary, and other M-nary data schemes (where M is a positive integer), one preferred embodiment of the invention operates in the context of binary data. More specifically, digital bit streams carried on one or more incoming channels are in the form of binary "on" and "off" bits. These digital bits are used to control a plurality of individual prime frequency component streams which are then combined to provide a composite prime frequency information stream. The prime frequency component streams are controlled by mapping each of respective incoming digital bits to a corresponding waveform in a group of N predetermined waveforms, where N is a positive integer. Each waveform has a prime frequency component that differs from the prime frequency components of other waveforms in the group of predetermined waveforms.

Optionally, each of the predetermined waveforms could be "weighed", or multiplied by an amplitude value representative of the value of an incoming data symbol. Optionally, each waveform in the group of N predetermined waveforms may be characterized by a mathematical basis function. Optionally, the foregoing mapping process can be implemented via a serial-to-parallel data conversion mechanism which utilizes a group of N basis functions. For purposes of illustration, a first incoming bit is mapped to a first basis function, a second incoming bit is mapped to a second basis function, and so on, until the Nth basis function is reached, whereupon the process cycles back to the first basis function. A cyclic assignment of bits to basis functions is described for purposes of illustration only, as noncyclic assignment processes could also be implemented.

Illustratively, if an incoming bit is a "1", "on", or "high" bit, this enables the corresponding basis function, whereas if the bit is a "0", "off", or "low" bit, this disables the corresponding basis function. When enabled, each respective basis function specifies the transmission of a corresponding predetermined waveform. Although the aforementioned process is binary, this is only described for illustrative purposes, as mapping could be performed on ternary, quaternary, or other N-ary digital data streams. In any case, each predetermined waveform includes a specific prime frequency component, and each predetermined waveform lasts for a specified length of time. In addition to a specific prime frequency component, the predetermined waveform could, but need not, include one or more additional frequency components, and these additional components could be prime, non-prime, or any of various combinations thereof.

Due to the fact that each basis function corresponds to a unique prime frequency component, each such frequency component is rendered substantially distinctive and non-interfering with respect to every other prime frequency component. This property is especially useful in situations where all or a portion of a communications link is provided in the form of a single transmission medium. Moreover, the unique and heretofore unexploited mathematical properties of prime numbers enables these prime frequency components to be expeditiously decoded by a receiving mechanism.

Enhancing effective bandwidth is accomplished by generating a plurality of predetermined waveforms, each corresponding to a given basis function having a respective prime frequency component. These predetermined waveforms are combined into disharmonic "chords" represented by a sum of the waveforms, and then a sequence of such chords is transmitted over the single transmission medium. This sum could be weighted or unweighted with respect to the individual predetermined waveforms. Pursuant to a further embodiment of the invention, each basis function in the group of N basis functions is mutually orthogonal with respect to all other basis functions in the group. Moreover, pursuant to an alternate embodiment, these basis functions or orthogonal basis functions may be mathematically "smoothed" to reduce sharp charges in the amplitude of the waveform as a function of time.

At the receiving end, a frequency-selective filtering mechanism separates information carried by a first prime number frequency component from information carried by other prime number frequency components. This enables waveforms at each individual prime number frequency component to be separated from the "chord", and thence used to reconstruct a digital stream of information corresponding to the original incoming digital signal. Alternatively, at the receiving end, an incoming waveform is detected, whereupon a solution for the weighting factors is formulated based upon the fact that the incoming waveform represents a sum of individual waveforms. The weighting factor solution is then converted to one or more symbol values. The foregoing process could, but need not, be implemented using a computer-executable program equipped to perform linear algebra.

One advantage of the foregoing process, referred to hereinafter as prime frequency encoding or PFE, is that communication is not limited by time, nor is use of a specific transmission medium required. PFE can generate a greater number of distinct channels over electronically-based, optically-based, or electromagnetically-based transmission media relative to multiplexing and compression systems heretofore known. Using the additional effective bandwidth which PFE provides, more information can be conveyed across a communications medium, thereby providing greater fidelity in transmission. The common practice of telephone companies is to connect incoming copper wire pairs from customer premises to a digital coding and decoding processor (CODEC) at the central office. The CODEC takes 8,000 samples per second at 8 bits, for a total of 64,000 bps. PFE can operate in the context of these conventional telephone company sampling rates, which is adequate for intelligible reproduction of the human voice, and which also permits high-speed data communication approaching or surpassing that of state-of-the-art 56K modems. However, these wire pairs can also be utilized as a communications link between the customer premises and the central office without the use of the aforementioned CODEC device. In such cases, the techniques of the present invention can improve data throughput to an even greater extent than would be the case if the CODEC were present.

PFE can also be implemented in a manner so as to code for the bandwidth limits of the human ear, which approaches 20,000 Hz, or any other arbitrarily-defined bandwidth. Digitizing can be accomplished by taking 44,100 samples, at 16 bits, for two channels (stereo), for a total of 1.4112 Mbits per second. This can yield music of CD (compact disk) quality over an existing telephone line or other transmission medium.

BRIEF DESCRIPTION OF DRAWINGS

For an improved understanding of the invention, as well as other objects and features thereof, reference is made to the accompanying drawings wherein.

DESCRIPTION OF INVENTION

The systems and methods of the present invention enhance the effective bandwidth capacity of communications links or storage media by simultaneously transmitting a plurality of prime frequency information streams, each of which is assigned a unique prime number frequency component, such that the combination of information streams creates a plurality of disharmonic chords as a function of time.

Pursuant to a first embodiment of the invention that increases the effective data throughput of a transmission medium, incoming information is received as a bit stream of binary coded information ("0"s and "1"s), and then transformed to an equivalent coding in which "0"="no-play" and "1"="play", to be applied to generation and/or transmission and/or enablement of one of a plurality of signal generators, wherein each respective signal generator produces a predetermined waveform having a corresponding prime number frequency component that differs from the prime frequency components of the other signal generators. A prime number is a positive integer having no divisor except itself and the integer 1. Thus, the number 31 is a prime number, whereas the number 30 is not. A prime frequency component is a frequency component (specified in Hz, KHz, MHz, GHz, THz) characterized by a prime number, such as 31 Hz, 5 KHz, and the like. The outputs of these signal generators are summed, after undergoing an optional weighting process, thereby providing a composite sequence of prime frequency information streams. The optional weighting process modifies the amplitude of a first signal generator relative to a second signal generator. This composite sequence may be conceptualized as including a sequence of "prime packets".

Methods and systems in accordance with the invention may be used in conjunction with any transmission medium capable of conveying or transmitting a stream of information. Such transmission media include wire, satellite transmission, wireless communications, radio frequency transmission over the air, radio frequency transmission through a coaxial cable, fiber optics, etc., such protocols as T1, ATM, Frame Relay etc, and modulation schemes such as AM, FM, PAM, PCM, PWM, phase modulation, quadrature amplitude modulation, and others. Systems and methods developed in accordance with the invention will function with virtually any digital information capable of being transmitted or stored, such as data, image, video or voice applications.

Figure 1:
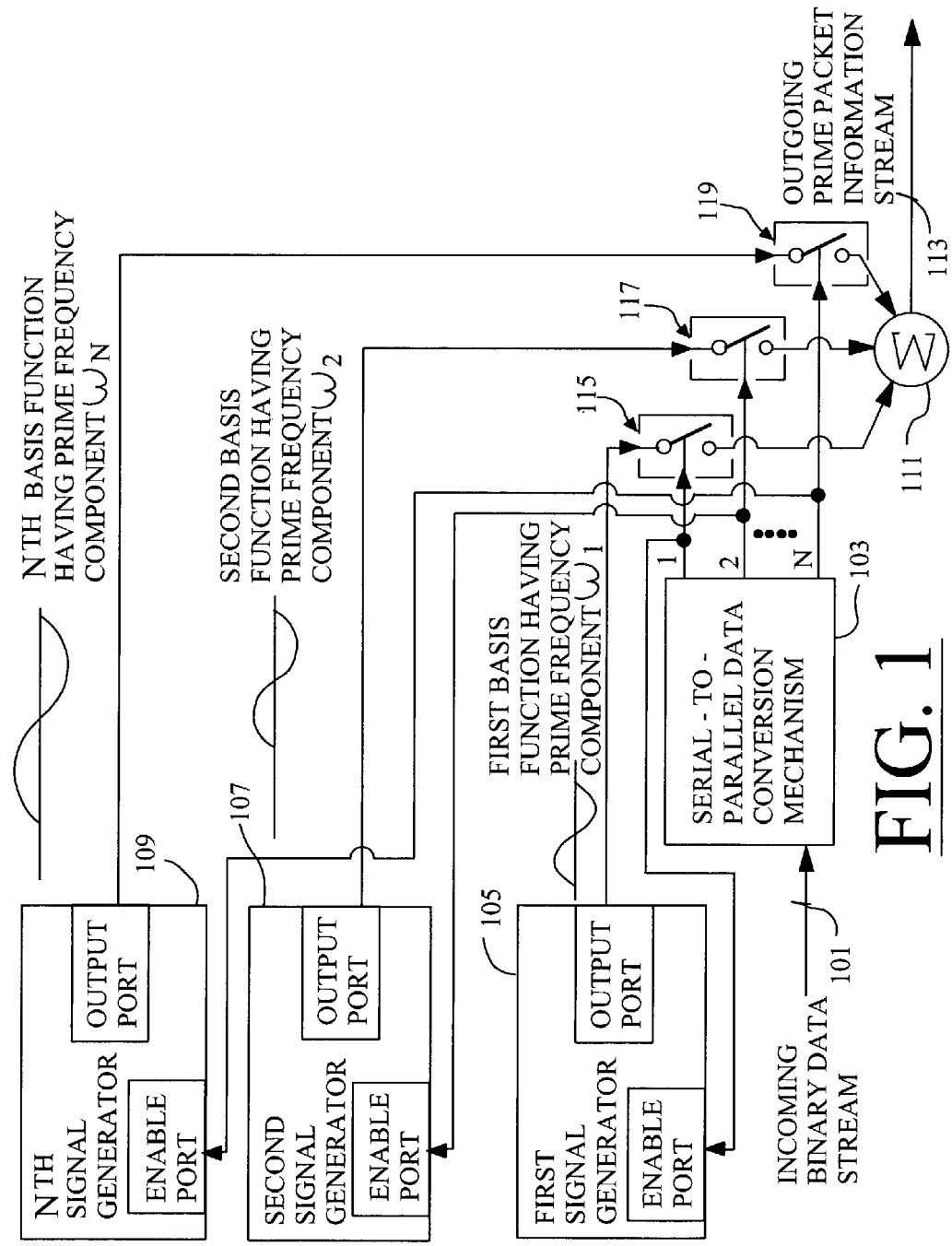
FIG. 1 is a hardware block diagram setting forth an illustrative hardware implementation of the present invention equipped to convert incoming binary data into prime packets for transmission over a communications link.

FIG. 1 is a hardware block diagram setting forth an illustrative hardware implementation of the present invention equipped to convert incoming binary data into prime packets for transmission over a communications link. An incoming binary data stream 101 includes a sequence of logical "1" 's and "0" 's. This data stream 101 may originate, for example, from a computing device such as a personal computer, server, or computer-readable data storage device, and/or from a telephonic or other communications device. Data stream 101 is inputted to a serial-to parallel data conversion mechanism 103 which converts a single incoming data stream (such as data stream 101) into N data streams, where N is a positive integer. Illustratively, this conversion process could map a first incoming bit to a first output line 1, a second incoming bit to a second output line 2, and so on, until the Nth incoming bit is routed to the Nth input line N, whereupon the process cycles back, such that the next incoming bit is routed to the first output line 1, and so on. Of course, a sequential routing of bits to each output line is not required, as any reversible algorithm could be employed to convert a single incoming binary data stream 101 into multiple data streams on N output lines.

The foregoing one-to-N conversion process is presented for illustrative purposes only, as an M-to-N conversion process could also be employed (where M and N are both positive integers). For example, a TCP/IP data stream could be multiplexed directly into a sequence of prime packets, so as to provide a many-to-many (M to N) mapping of incoming data streams onto a plurality of prime packet streams.

Returning now to FIG. 1, each of the N output lines 1, 2, . . . N is routed to a corresponding switch 115, 117, 119, and controls the state of that switch. For example, output line 1 controls switch 115, output line 2 controls switch 117, and output line N controls switch 119. Although FIG. 1 shows a mechanical implementation of switches 115, 117, and 119, this is solely for illustrative purposes, as these switches could be implemented electronically, in firmware, in software, or in various combinations thereof.

A first pole of switch 115 is coupled to the output port of a first signal generation 105, a first pole of switch 117 is coupled to the output port of a second signal generator 107, and a first pole of switch 119 is coupled to the output port of an Nth signal generator 109. First signal generator 105 is adapted to generate a first basis function having a first prime frequency component $\omega_1$. Second signal generator 107 is adapted to generate a second basis function having a second prime frequency component $\omega_2$, and Nth signal generator 109 is adapted to generate an Nth basis function having an Nth prime frequency component $\omega_N$. Each basis function specifies the generation of a predetermined waveform for a predetermined length of time. Each basis function has at least one prime frequency component $\omega_N$ which is at a different frequency than a prime frequency component of another basis function. Although one or more of the basis functions could be provided in the form of prime frequency sinusoids of at least one or two cycles in duration, waveforms other than sinusoids may be employed. In such cases, the frequency component of the nonsinusoidal waveform can be determined by taking a Fourier Transform of this waveform. Alternatively, for narrowband signals, the instantaneous frequency (the time derivative of signal phase) could be used to determine the frequency component of the nonsinusoidal waveform. Illustrative basis functions will be described in much greater detail hereinafter.

First signal generator 105 has an "enable" port which is coupled to the first output line 1, directly, or optionally through an inverter stage. In this manner, the first signal generator 105 is not enabled until a logical "high" or "1" bit appears at the first output line 1, if an inverter stage is not used. This permits proper phase synchronization of the waveform generated by first signal generator 105. On the other hand, if an optional inverter stage is used, the first signal generator 105 is not enabled until a logical "low" or "0" bit appears at the first output line 1. In a similar manner, second signal generator 107 has an "enable" port which is coupled to the second output line 2, and Nth signal generator 109 has an "enable" port which is coupled to the Nth output line N.

The aforementioned enable ports may be utilized to resolve potential timing issues. Data stream 101 may be conceptualized as a sequence of symbols. Accordingly, a finite period of time elapses between two successive signals appearing in data stream 101. If a signal generator is enabled as soon as an incoming symbol is received, the output of summing device 111 could be useful for some system applications, but it may not be sufficiently self-contained and time-delimited for other applications. This is due to the fact that the waveform mapped to the first symbol may have already ended (i.e., the waveform has been completely "played") before the waveform mapped to the last symbol begins. One approach is to wait until all output streams of the serial-to-parallel converter 103 are ready to generate their corresponding waveforms (optionally, with waveform amplitudes corresponding to symbol values), and then enable all generators at substantially the same time. Pursuant to the aforementioned approach, the enable ports may be controlled by serial-to-parallel converter 103, such that all generators are started as soon as all N output streams from the serial-to-parallel converter have received a symbol.

Returning again to FIG. 1, a second pole of switch 115, a second pole of switch 117, and a second pole of switch 119 are each coupled to a respective input port of a summing device 111. When a particular switch, such as switch 115, is placed into a "closed" state by a corresponding output line (output line 1 in the present example), this permits the output of first signal generator 105 to be applied to an input port of summing device 111. A "closed" state signifies completion of an electrical circuit between the first and second poles of a switch, whereas an "open" state signifies lack of a completed circuit path between the first and second poles of a switch. In practice, the "closed" state may provide a low-impedance and/or low-resistance circuit path between the first and second poles of a switch, whereas the "open" state may provide a high-impedance and/or high-resistance circuit path between these poles.

In an analagous manner, when switch 117 is placed into a "closed" state by output line 2, this permits the output of second signal generator 107 to be applied to an input port of summing device 111, and when switch 119 is placed into a "closed" state by output line N, this permits the output of Nth signal generator 109 to be applied to an input port of summing device 111. The output of summing device 111 is a waveform that includes contributions from zero, one, or more than one of the signal generators 105, 107, 109. At any particular moment in time, this waveform may include contributions from one, some, all, or none of these signal generators. When a particular switch, such as switch 115, is placed into an "open" state, for example, by output line 1, the output of first signal generator 105 will not be applied to an input port of summing device 111, and the output of summing device 111 will not include contributions from the first signal generator 105 substantially during the time that switch 115 is in the "open" state.

The output of summing device 111 represents an outgoing prime packet information stream 113. This information stream may be transmitted over any communications link, such as a wireless and/or RF (radio frequency) communications system, a wired connection, a fiber-optic network, a satellite system, and various combinations thereof. The contents of this outgoing prime packet information stream 113, representing an encoded version of incoming binary data stream 101, will be described in greater detail hereinafter.

Prime Packet Information Stream

Conceptually, a prime packet is constructed from a set of waveforms, each of which is characterized by a corresponding basis function, or each of which is related to a corresponding basis function. In turn, the basis functions each incorporate one or more prime numbers. These basis functions are utilized, potentially in a modified form, to encode a sequence of symbols as a continuous-time signal, and to decode this signal into the sequence of symbols that it represents. Encoding occurs by computing a weighted sum, also called a linear combination, of the basis functions. Alternatively, a non-weighted sum of the basis functions could be computed, but this approach would not be utilized in most circumstances. In general, weighting is employed, and the weight for a given basis function is given by the symbol corresponding to that basis function. In the case of binary symbols, the weight is given by the corresponding symbol value (i.e., a zero or a one), wherein zero specifies "add the corresponding basis function" and one specifies "skip the corresponding basis function". Each basis function corresponds to a position in a sequence of symbols in a predetermined way, and may be identified by the position in the sequence to obtain a first, second, third, etc. basis functions. These symbols may represent incoming digital data, and/or may be generated from this incoming data.

Various preferred embodiments of the invention incorporate prime numbers into some or all of the basis functions. As a practical matter, use of prime numbers makes it much more difficult to accidentally generate a linearly dependent set of functions. Moreover, use of prime numbers ensures that there is no element in the set of basis functions that can be constructed using only a linear combination of the other elements—that they are linearly independent—which is required for each sequence of symbols to yield a unique signal. This linear independence must be provided in order for the decomposition of the signal into constituent weighting factors and basis functions to yield a unique solution. Finally, use of prime numbers is advantageous in permitting the construction of a set of basis functions that are very compact in amplitude. With prime numbers, the lack of common divisors allow for instantaneous peaks in the basis functions to occur at different points in time.

Notwithstanding the foregoing, in constructing a set of linearly independent basis functions, it is not mandatory to incorporate prime numbers into any or all of these functions. The only absolute requirement is linear independence. Pursuant to an alternate embodiment of the invention, some or all of the basis functions do not incorporate prime numbers.

Figure 2:
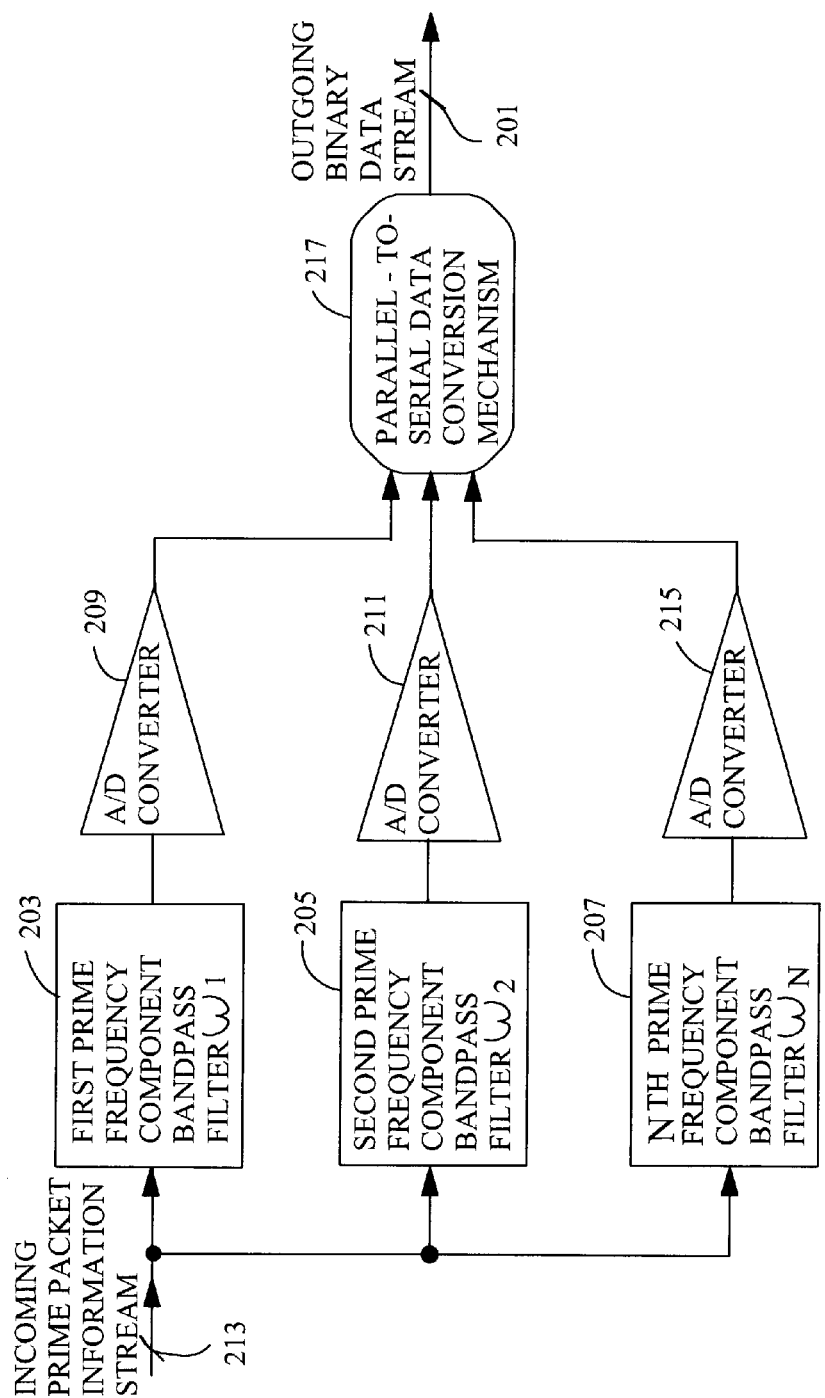
FIG. 2 is a hardware block diagram setting forth an illustrative hardware implementation of the present invention equipped to decode an incoming prime packet stream into one or more streams of binary data.

FIG. 2 is a hardware block diagram setting forth an illustrative hardware implementation of the present invention equipped to decode an incoming prime packet information stream 213 into one or more streams of binary data (such as outgoing binary data stream 201). This embodiment is useful in situations wherein each of respective basis functions substantially includes a corresponding frequency component. In situations where the basis functions are spread out in the frequency domain, other decoding schemes are employed. The incoming prime packet information stream 213 is coupled to a plurality of bandpass filters. Each filter is designed to substantially pass a predetermined prime frequency component, while substantially rejecting a plurality of other prime frequency components. For example, a first prime frequency component bandpass filter 203 substantially passes a prime frequency component having a first frequency designated as $\omega_1$. Similarly, a second prime frequency component bandpass filter 205 substantially passes a prime frequency component having a second frequency designated as $\omega_2$, and so on, up to an Nth prime frequency component bandpass filter 207, which substantially passes a prime frequency component having a frequency designated as $\omega_N$.

First, second and Nth prime frequency component bandpass filters 203, 205, 207 may be realized using any of a number of digital filter designs, analog filter designs, or various combinations thereof. Illustratively, Butterworth or Chebyshev designs could be employed, and/or the bandpass filters could be implemented by combining or cascading a low-pass filter with a high-pass filter. If relatively low frequencies are employed (for example, below 20 KHz), then mechanical or ceramic resonator elements could be employed. In the case of higher frequencies, discrete or lumped inductive and capacitive elements may be provided, such as inductors, capacitors, and/or transmission lines. In any event, the structure and function of these filter designs is a matter well within the knowledge of the skilled artisan.

The output of first prime frequency component bandpass filter 203 is coupled to a first analog-to-digital converter (A/D converter 209). Likewise, the output of second prime frequency component bandpass filter 205 is coupled to a second analog-to-digital converter (A/D converter 211), and the output of the Nth prime frequency component bandpass filter 207 is coupled to an Nth analog-to-digital converter (A/D converter 215). The first, second, and Nth A/D converters 209, 211, 215 may be implemented using any of various techniques which are within the knowledge of skilled artisans. These converters may be provided in the form of general-purpose integrated circuits, ASICs (application specific integrated circuits), discrete elements, or the like. A/D converters 209, 211, 215 are adapted to measure and apply a threshold to energy in the bandpass-filtered signals for the duration of a basis function. For example, A/D converters 209, 211, 215 may utilize an analog component that produces, say, 0 volts or +5 volts, depending upon whether the bandpass-filtered signal contains sufficient energy to enable a determination that the corresponding basis function should be included in the reconstructed (decoded) signal.

N discrete A/D converters 209, 211, 215 are shown in the configuration of FIG. 2 for illustrative purposes, as a single A/D converter could be shared among all N prime frequency component bandpass filters. Or two or more prime frequency component bandpass filters could share a single A/D converter. In cases where an A/D converter is shared among more than one bandpass filter, an optional switching mechanism could be employed to selectively direct the output of a particular prime frequency component bandpass filter to the input of the A/D converter at a particular point in time. At a later point in time, the switching mechanism would then route the output of another prime frequency component bandpass filter to the input of this A/D converter. In this manner, the input of the A/D converter would be sequentially coupled to the output of each of a plurality of prime frequency component bandpass filters. Given the symbol values, the symbols do not need to be output in the correct order. Nonetheless, if a single stream is split over multiple channels, the receivers need to recombine these multiple channels properly.

Returning to the illustrative embodiment shown in FIG. 2, the outputs of the A/D converters 209, 211, and 215 are fed to an optional parallel-to-serial data conversion mechanism 217 which converts a plurality of parallel streams of incoming information into a single outgoing binary data stream. Pursuant to an alternate embodiment of the invention, the outputs of each A/D converter 209, 211, 215 could each represent a separate, individual, independent stream of binary data which is not combined with streams from any other A/D converter. Moreover, in the embodiment described in the foregoing paragraph where a single A/D converter is shared among all prime frequency component bandpass filters, then the parallel-to-serial data conversion mechanism 217 is not required. In any event, outgoing binary data stream 201 may represent data in conventional binary form.

Figure 3:
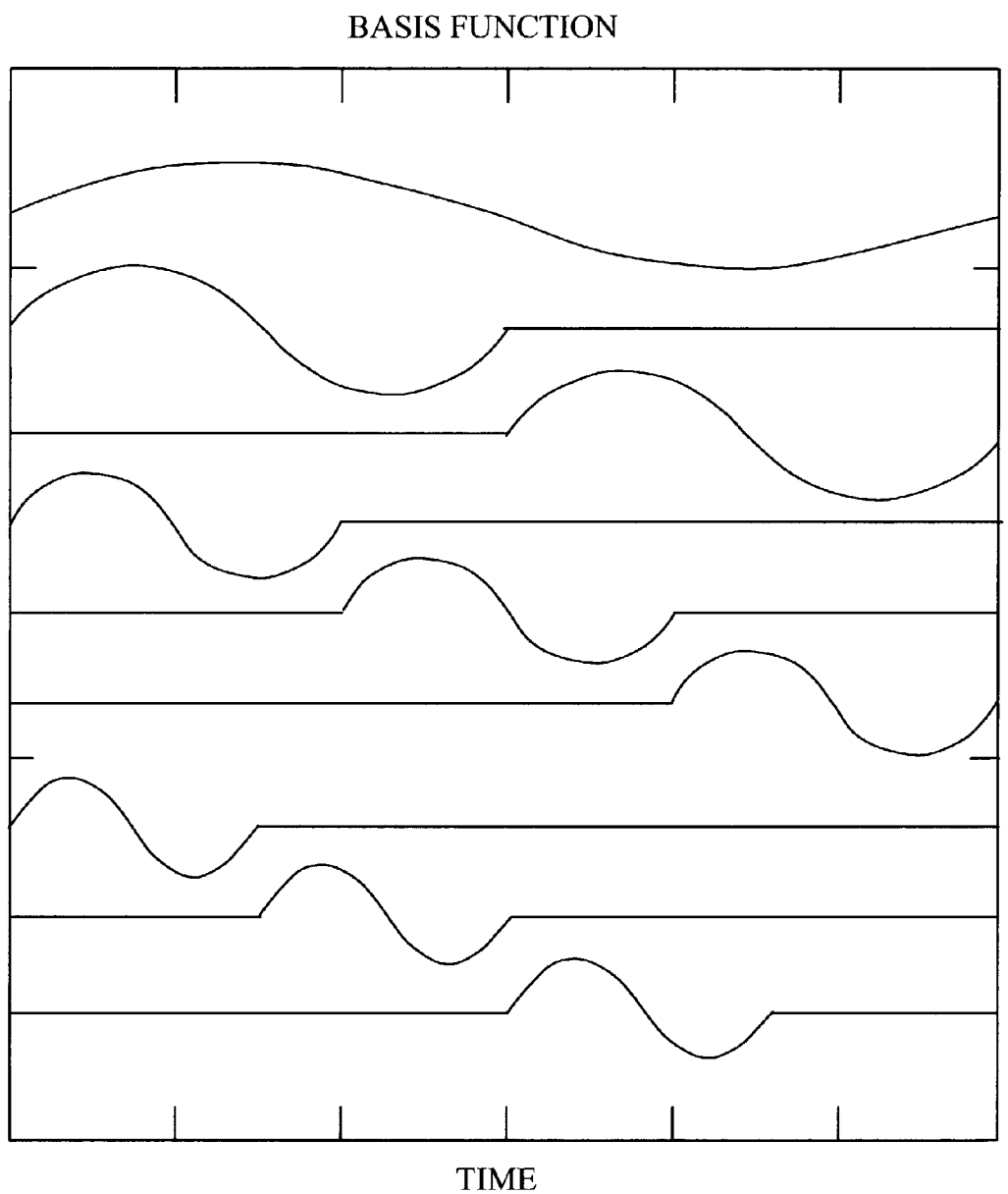
FIG. 3 is a waveform diagram setting forth nine illustrative basis functions which may be used to convert an incoming binary data stream into a prime packet stream.

An illustrative prime packet information stream 213 (FIG. 2) and 113 (FIG. 1) may be constructed using any of a number of different techniques. For example, refer to FIG. 3, which is a waveform diagram setting forth nine illustrative basis functions. These basis functions are used to convert an incoming binary data stream into a prime packet stream. The set of basis functions set forth in FIG. 3 are each defined using a single period of a sine function. Each sine function is assigned a specific frequency which, pursuant to a preferred embodiment of the present invention, is a prime number. For a prime packet of arbitrary duration, one might be able to fit multiple non-overlapping periods of a given prime frequency sinusoid within the packet; however, if each sinusoid is at a different frequency, some or all of these different sinusoids may overlap. The basis functions illustrated in FIG. 3 each have a single prime frequency component selected from a group of prime frequencies. For illustrative purposes, the group of possible prime frequencies includes 331 Hz, 673 Hz, 997 Hz and 1321 Hz. The duration of the prime packet is exactly one full cycle at the lowest prime frequency. Each of the nine horizontal waveform representations of FIG. 3 represents a corresponding basis function.

Figure 4:
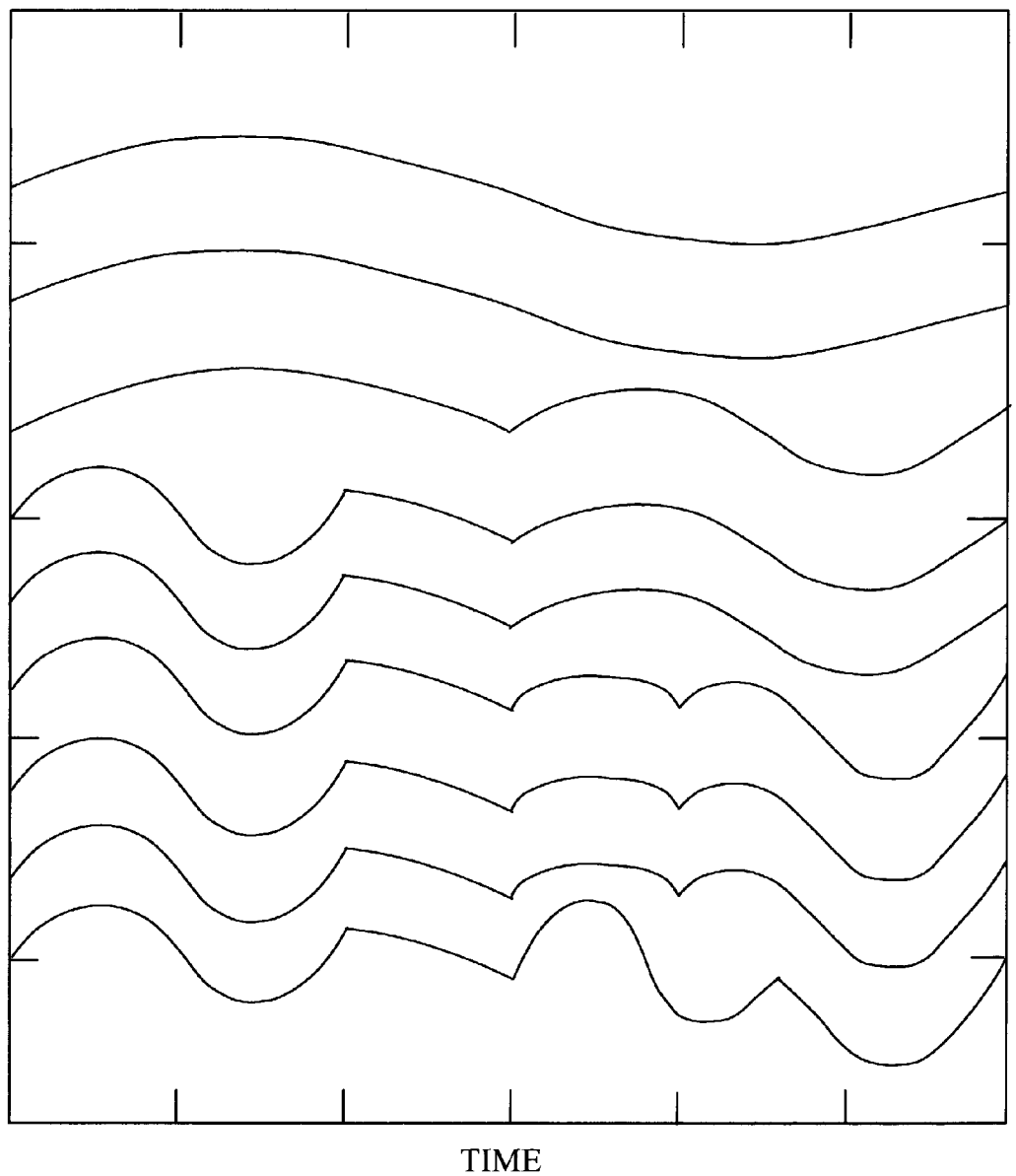
FIG. 4 is a waveform diagram showing the construction of an illustrative prime packet from an incoming binary data stream that sets forth a bit sequence of 1011010001.

Employing these basis functions in the context of a sequence of symbols, such as 0 and 1 (for simplicity), it is possible to construct a corresponding prime packet. FIG. 4 sets forth the waveform of a prime packet resulting from an illustrative binary symbol sequence of [101101001] with the bits added one-by-one (so the first horizontal line corresponds to "1", the second to "10", the third to "101", etc.).

Further Embodiments

Although the foregoing basis functions describe a realizable implementation of the invention, alternative implementations are possible. In some system applications, these alternatives may provide enhanced performance over the basis functions described above.

Smooth functions

A basis function that has a value of zero, except for a single period of a sine wave, as in the case of the functions described above, has a discontinuity in the rate of change at the start and end of that period. This discontinuity can easily be seen from the graph of FIG. 5, with reference to the two encircled regions of the waveform.

Figure 5:
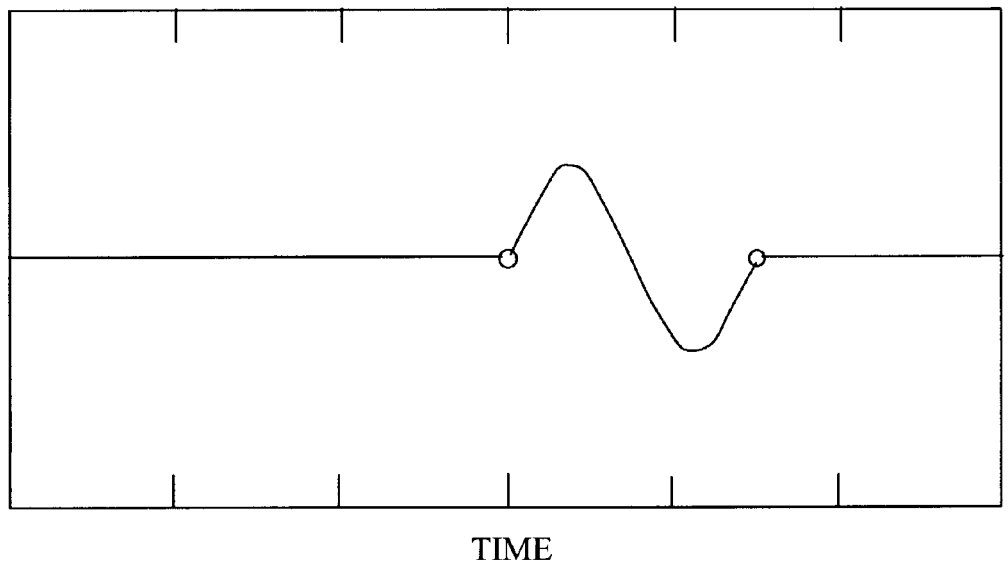
FIG. 5 is a waveform diagram showing a first illustrative basis function with starting and ending times marked.

Actual construction of an electrical signal exactly like that shown in FIG. 5 is virtually impossible (at least, pursuant to well-known principles of classical physics): realizable physical design implementations will force the waveform to be smoother than what is depicted in FIG. 5, thereby introducing distortion and noise. A distorted sinusoidal signal contains components at frequencies that are higher than the fundamental frequency of the sinusoid. In practice, such distortion exists in the form of noise (broadband high-frequency hash) introduced by the abrupt transitions which result when a sinusoidal signal is stopped or started. These components are very hard to transmit over bandwidth-limited communications links. Links employing wire transmission lines would add even more distortion, as will be described in greater detail hereinafter.

Figure 6:
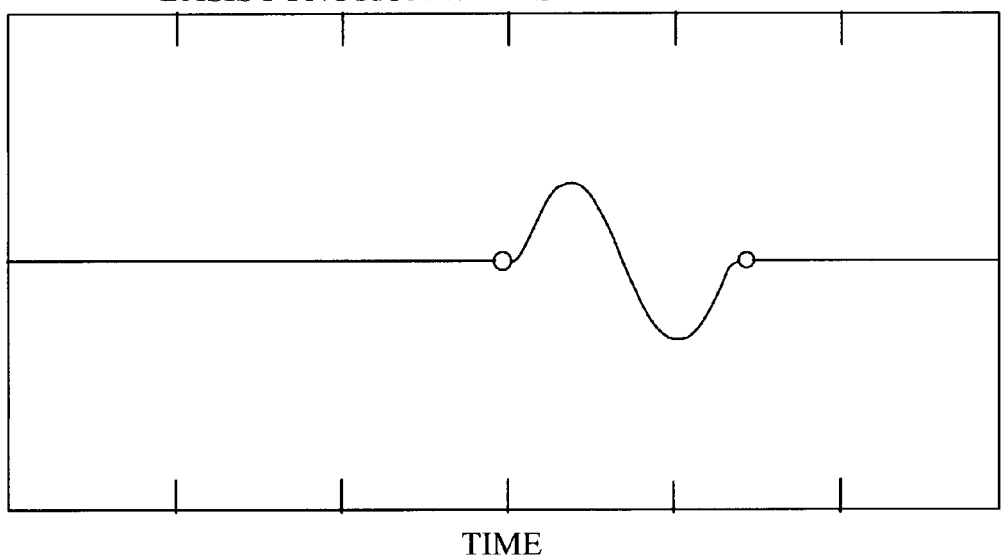
FIG. 6 is a waveform diagram showing a second illustrative basis function with starting and ending times marked.

FIG. 6 illustrates an alternative to using a single period of a sinusoid as a basis function. The waveform of FIG. 6 is generated by inverting the phase of a single-period sinusoid by 180 degrees, halving the amplitude of this inverted sinusoid, doubling its frequency, and then adding it to the original sinusoid. A single-period sinusoid is described herein for purposes of illustration, as the same techniques could be employed in the context of multiple-period sinusoids. Moreover, these techniques could be adapted to half-period sinusoids, and combinations of multiple-period and half-period sinusoids.

In the context of single and multiple full-period sinusoids, instead of using a conventional sinusoidal function mathematically denoted as sin (2πft), where ω=2πf, a "smooth" basis function is defined by $\sin(\omega t) - 0.5 \sin(2\omega t)$, where f is the frequency in cycles per second. The derivative of this "smoothened" basis function is zero at the start (and end) of each full sinusoidal period, such that generating whole periods of this function is physically realizable. The "smoothness" of this function is depicted in the waveform of FIG. 6.

Observe that the transitions at the beginning and end of the quasi-sinusoidal waveform of FIG. 6, which have been encircled for emphasis, are much more gradual than the corresponding encircled transitions of FIG. 5. For the convenience of the reader, these transitions have been illustrated with greater clarity in FIGS. 7, 8, and 9. The waveform amplitudes of FIGS. 7, 8, and 9 have been compressed relative to the waveform amplitudes of FIGS. 5 and 6. Additionally, the time (horizontal, or X-axis) has been elongated in the waveform diagrams of FIGS. 7, 8, and 9, relative to that of FIGS. 5 and 6, to better illustrate critical features of the various waveforms.

Figure 7:
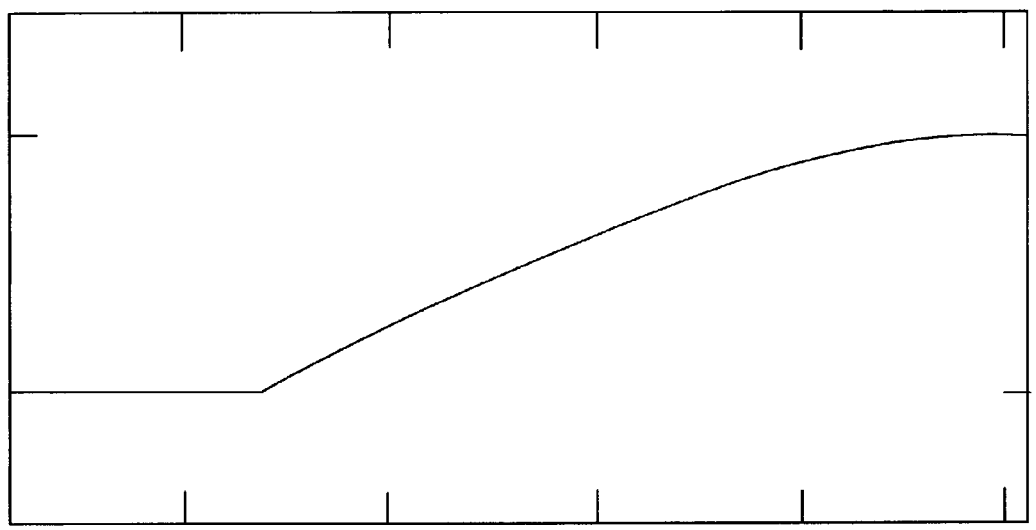
FIG. 7 is an exploded view showing the leftmost encircled region of the waveform diagram of FIG. 5.

FIG. 7 is an exploded view showing the leftmost encircled region of the waveform diagram of FIG. 5. The waveform of FIG. 7 is defined as having a value of zero between the left-hand vertical (or Y) axis, and the first (leftmost) cross-hatch mark on the horizontal (or X, or TIME axis). Observe the abrupt transition from zero to an ever-increasing value just after the first (leftmost) cross-hatch mark on the horizontal axis.

Figure 8:
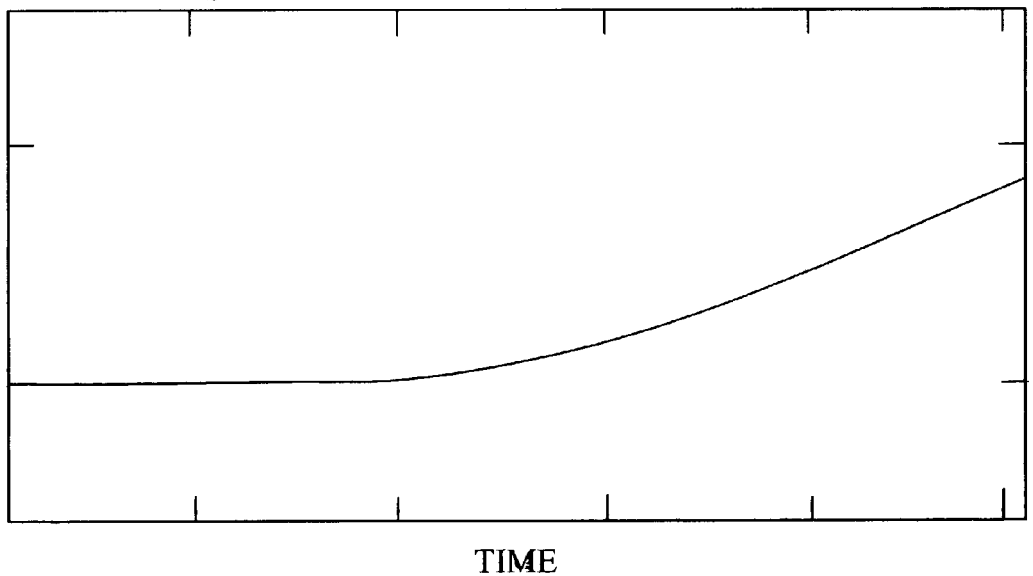
FIG. 8 is an exploded view showing the leftmost encircled region of the waveform diagram of FIG. 6.

FIG. 8 is an exploded view showing the leftmost encircled region of the waveform diagram of FIG. 6. The waveform of FIG. 8 is defined as having a value of zero between the left-hand vertical (or Y) axis, and the first (leftmost) cross-hatch mark on the horizontal (or X, or TIME axis). Observe the very gradual transition from zero to an ever-increasing value just after the first (leftmost) and second cross-hatch marks on the horizontal axis.

Figure 9:
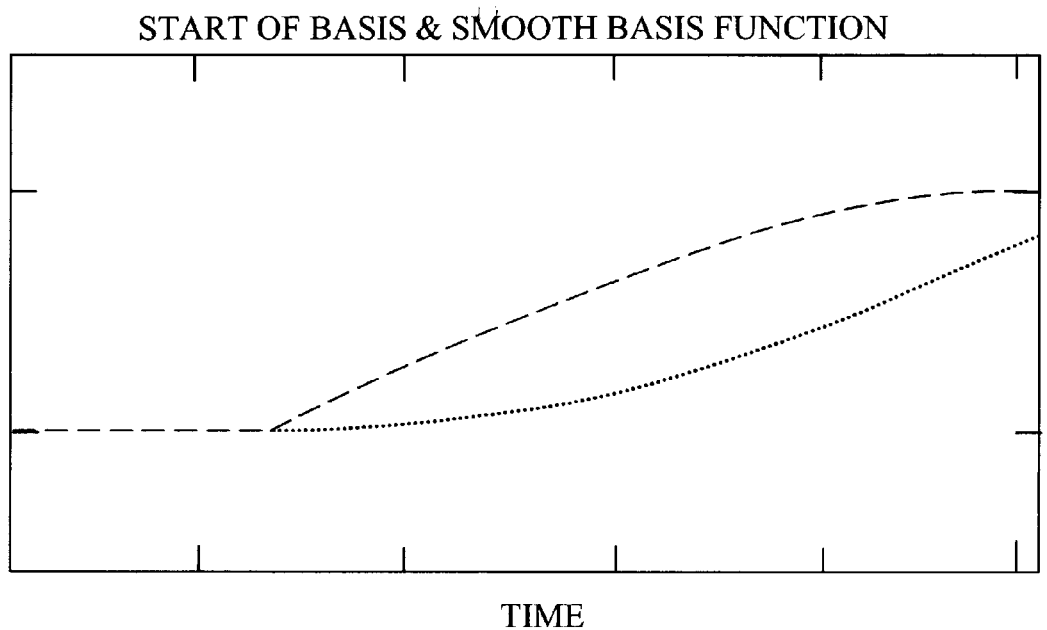
FIG. 9 is an exploded view showing the waveform diagrams of FIGS. 7 and 8 superimposed for purposes of comparison.

FIG. 9 is an exploded view showing the waveform diagrams of FIGS. 7 and 8 superimposed for purposes of comparison. Both waveforms are defined as having a value of zero between the left-hand Y-axis and the first (leftmost) cross-hatch mark on the X-axis. Just to the right of the first cross-hatch mark on the X-axis, the waveform that was also shown in FIG. 7 is indicated with a dashed line, whereas the waveform that was also shown in FIG. 8 is indicated with a dotted line. Observe that the dotted line exhibits virtually no discontinuity or abrupt changes from a value of zero all the way to the right-hand edge of the graph. On the other hand, the dashed line exhibits a marked abrupt change from a value of zero to an ever-increasing value, just to the right of the first (leftmost) cross-hatch on the X-axis.

Figure 10:
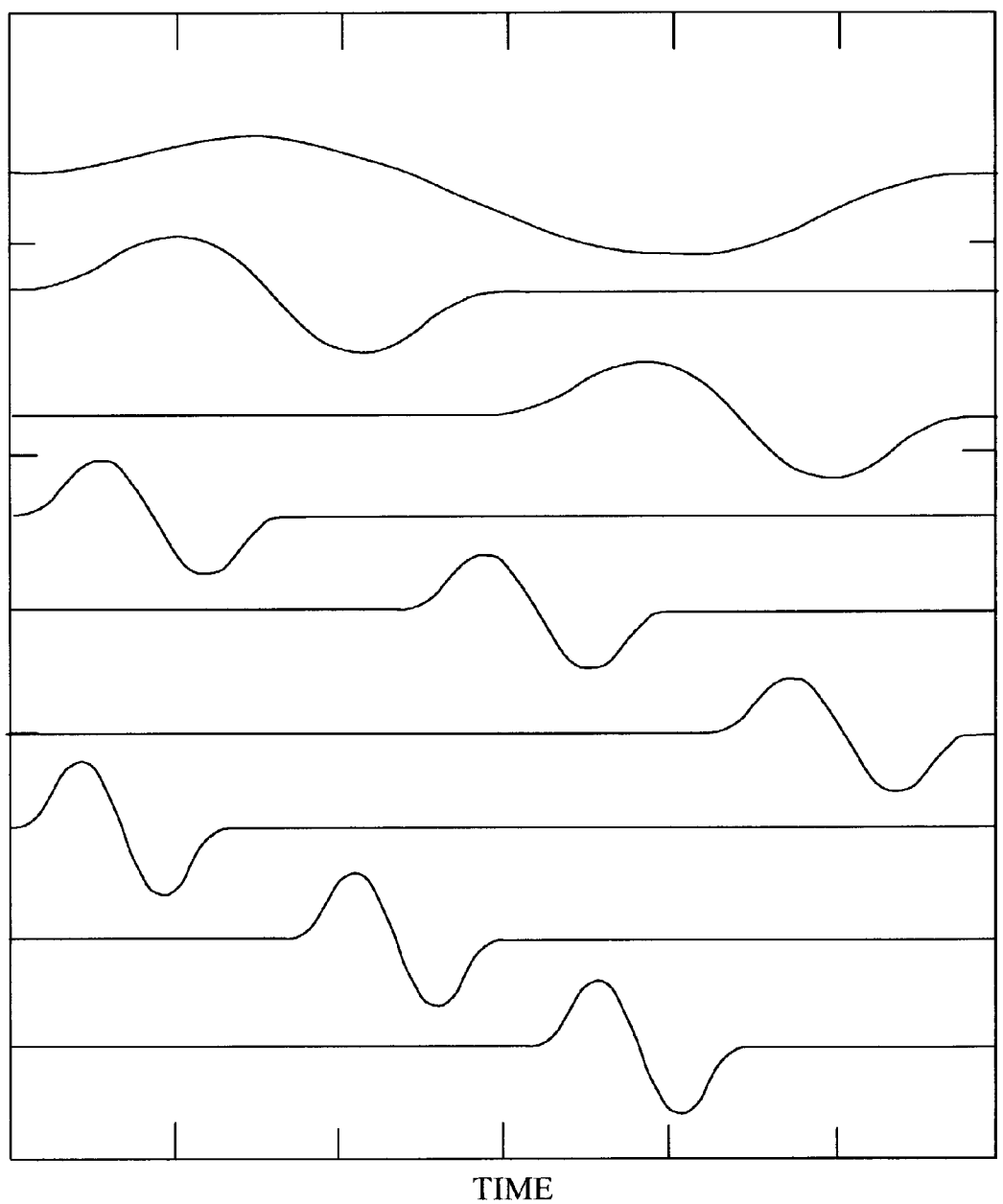
FIG. 10 is a waveform diagram setting forth nine illustrative smooth basis functions which may be used to convert an incoming binary data stream into a prime packet stream.
Figure 11:
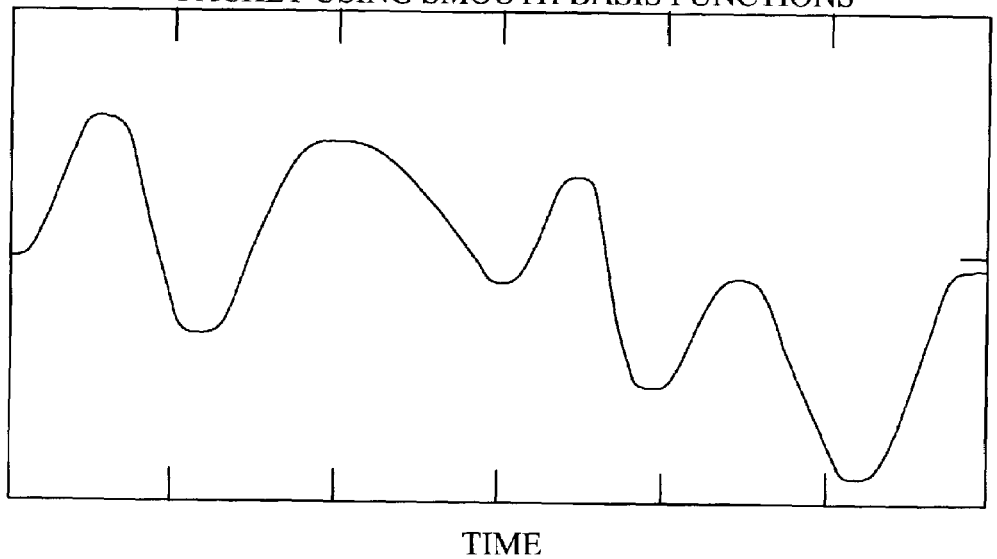
FIG. 11 is a waveform diagram showing an illustrative prime packet stream constructed using the smooth basis functions of FIG. 10.

The techniques described in conjunction with FIGS. 6–9 may be used to construct a set of "smooth" basis functions. For instance, a set of 9 illustrative smooth basis functions is shown in FIG. 10. Encoding the symbol sequence [101101001] using the smooth functions of FIG. 10 yields a prime packet waveform as shown in FIG. 11. The prime packet waveform of FIG. 11 is analagous to the prime packet waveform previously described with reference to FIG. 4, with the notable exception that the prime packet waveform of FIG. 4 was constructed using non-smoothed basis functions.

Orthogonal Basis

With reference to FIGS. 3 and 10, either set of basis functions—smoothed or non-smoothed—will provide useful performance in many system applications. However, both the smoothed, as well as the non-smoothed, basis functions generate prime packet waveforms that are susceptible to noise under certain conditions. Due to the fact that information is packed into a rather small time-frequency window, a disturbance of the prime packet waveform—caused by round-off error in a computer or heavy static discharge—may result in incorrect interpretation of one or more symbols.

As a general consideration, when a basis function is transmitted as part of a prime packet, this basis function will be present for a given "window" of time. If the length of this time window is somehow increased, the robustness of the encoded prime packet will be enhanced. In other words, it may be advantageous to "smear" or "spread" the basis functions in time (and/or in frequency). One way to accomplish this spreading function is to employ a mathematical process well known to skilled artisans as the Gram-Schmidt procedure. The Gram-Schmidt procedure is a generally-known technique for constructing a set of mutually orthogonal basis functions from a set of "input" basis functions that may not be mutually orthogonal. In the present situation, given a set of n basis functions, the Gram-Schmidt procedure is used to determine n weighted sums of those basis functions that are orthogonal to each other. The orthogonality in itself is a very useful property, but what is more important here is that such a weighted sum is spread out in time—because it also contains basis functions that are non-zero in different portions of the prime packet waveform. One may also observe that this weighted sum is spread out in frequency—in part, because the Gram-Schmidt procedure uses a set of input basis functions, some or all of which are at different frequencies.

Figure 12:
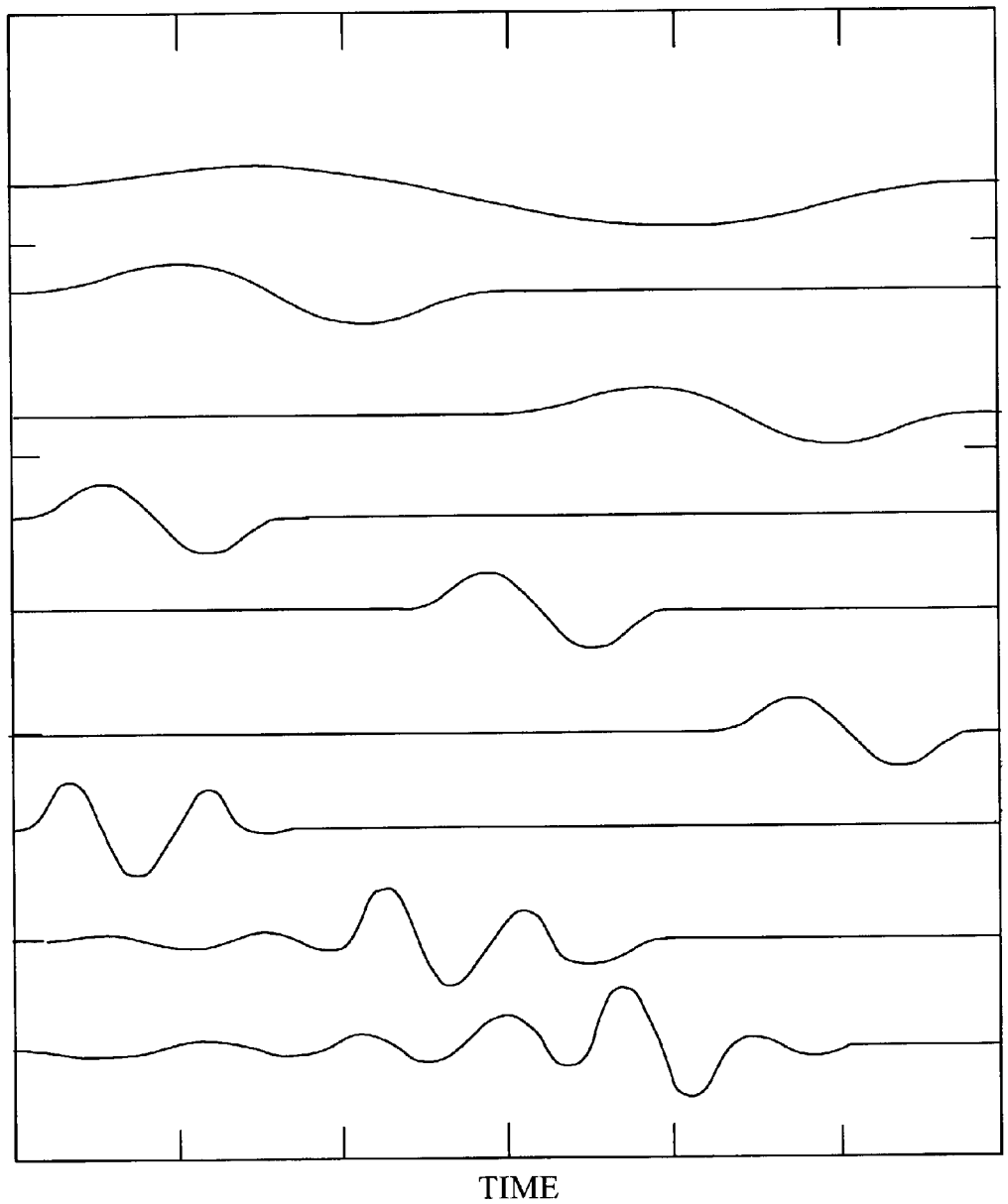
FIG. 12 is a waveform diagram setting forth nine illustrative orthogonal basis functions which may be used to convert an incoming binary data stream into a prime packet stream.
Figure 13:
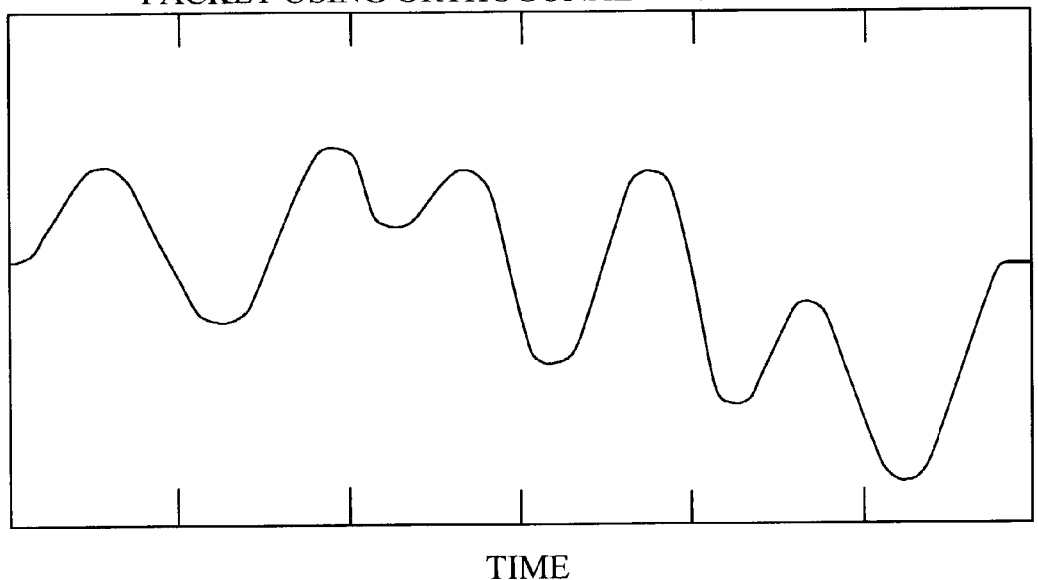
FIG. 13 is a waveform diagram showing an illustrative prime packet stream constructed using the orthogonal basis functions of FIG. 12.

An illustrative set of orthogonal basis functions constructed in accordance with the Gram-Schmidt process is shown in FIG. 12. A prime packet constructed in accordance with the orthogonal basis functions of FIG. 12 is shown in FIG. 13. Conceptually, note that a prime packet is a weighted (or unweighted) sum of basis functions. Further, observe that the orthogonal basis functions constructed by the Gram-Schmidt procedure are weighted sums of the original (i.e., input) basis functions. It follows that a packet constructed as a weighted sum of the orthogonal basis functions is equal to another packet constructed as a weighted sum of the original basis functions—although the weighting factors are likely to be very different. But, if the original basis functions (i.e., the functions that are inputted into the Gram-Schmidt procedure) are smooth, then so is the set of constructed orthogonal basis functions that are outputted by the Gram-Schmidt procedure. Moreover, note that construction of a prime packet does not depend on the shape of the basis functions input. This construction process works equally well for the non-smooth and smooth basis functions introduced above.

Transmission Line Effects

The effect of a transmission line on a signal (such as a prime packet waveform) is three-fold: (1) it disperses the signal in frequency and time, (2) it attenuates the signal, and (3) it delays the signal—but these three effects are not independent. In the present context, delay is not problematic, as it is independent of the actual signal. On the other hand, the two remaining factors have an increasingly adverse impact with increasing frequency and distance. A low-frequency signal can travel a longer distance than a high-frequency signal before it becomes undetectable. Moreover, low-frequency waveforms are typically better at retaining their shape as they travel from transmitter to receiver over a communications link that includes a conductive transmission line. In other words, the shape of a low-frequency waveform as it arrives at the receiver will more closely resemble the signal that was actually transmitted, whereas the same may not be true of a higher-frequency waveform.

Fortunately, transmission lines can be modeled, allowing one to determine the effect of a transmission line on a particular signal without actually transmitting this signal. Traditionally, this modeling approach could only be performed for periodic signals, but we have developed a method that allows one to determine the effect of the transmission line on a non-periodic or transient signal. With this method, not only can we predict the extent of the distortion, but we can compute what a particular signal will look like at the receiver, and thus correct for the transmission line. The method requires the signal to be "smooth" as described above, which is another reason to prefer smooth basis functions over those that aren't smooth.

The transmission line effect determination method is linear in the sense that the result of applying it to the sum of two signals is the same as applying it to both signals independently and then adding the results. Also, scaling the input by a constant is equivalent to first computing the result for the unscaled input, and then multiplying by the constant. With these properties, the effect of the transmission line need only be computed once for each of the basis functions: the received signal corresponding to a particular packet is then given by a weighted sum (with the same weighting factors) of the basis functions after traversing the transmission line.

Figure 14:
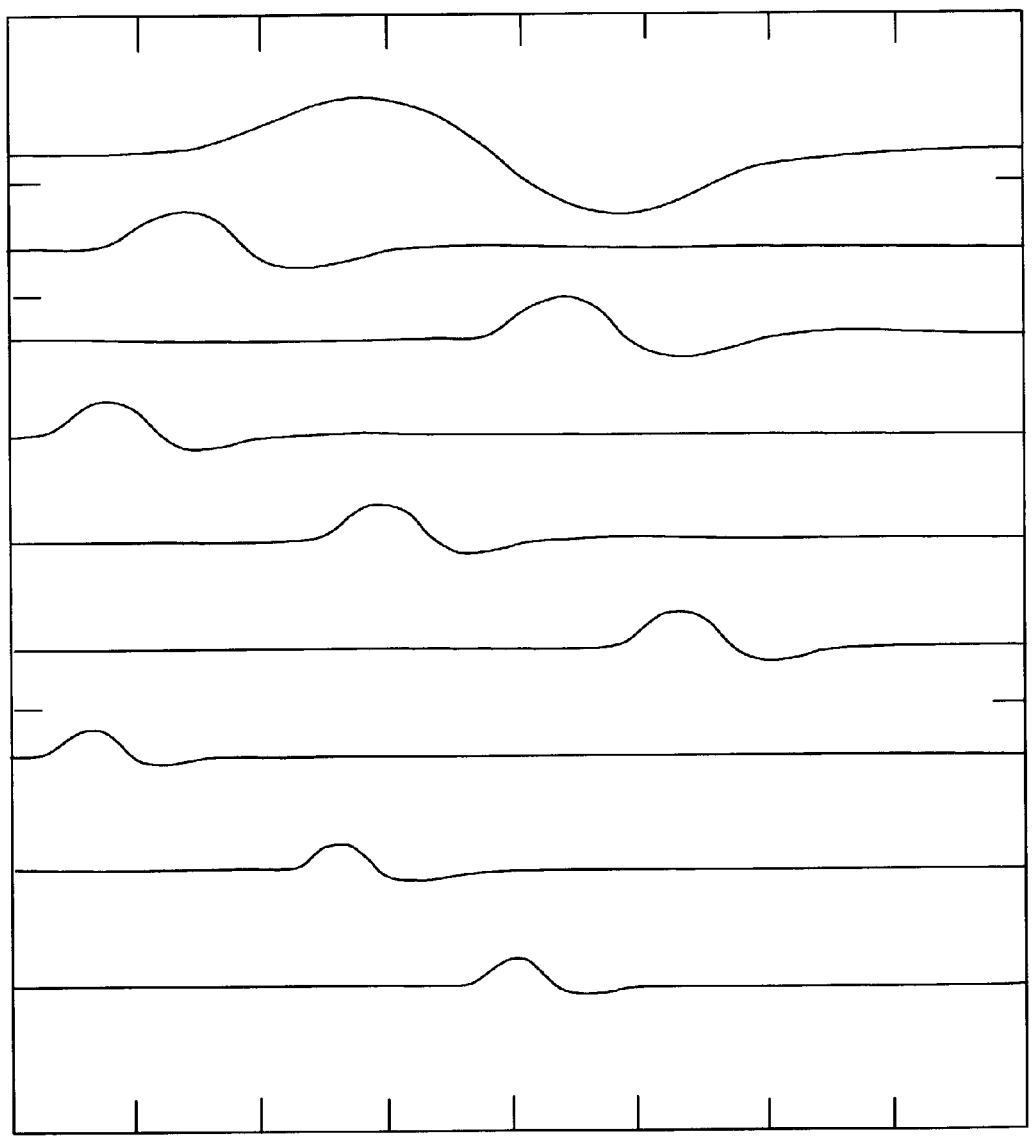
FIG. 14 is a waveform diagram setting forth the nine illustrative orthogonal basis functions of FIG. 12 which have been subjected to transmission line losses of a typical telephone company subscriber loop.

FIG. 14 is a waveform diagram setting forth the nine illustrative orthogonal basis functions of FIG. 12 which have been subjected to the transmission line losses of a typical telephone company subscriber loop. In preparing the waveform diagrams of FIG. 14, reasonable approximations of electrical properties for the transmission line have been adopted, assuming a distance of 10 km between transmitter and receiver. These reasonable approximations are as follows: resistance (R) is assumed to be $286*10^{-3}$ ohms per meter, inductance (L) is assumed to be $672*10^{-9}$ Henrys per meter, conductance (G) is assumed to be $30*10^{-9}$ mhos per meter, and capacitance (C) is assumed to be $49*10^{-12}$ Farads per meter. In practice, these values will vary somewhat from subscriber loop to subscriber loop. Such parameter changes affect the waveform observed at the receiving end of the subscriber loop. One would need to empirically measure these values if an exact determination of waveform degradation is required. Time delay is not shown in the waveforms of FIG. 14, and the attenuation for a signal is visible only relative to that for another signal in the same figure.

Figure 15:
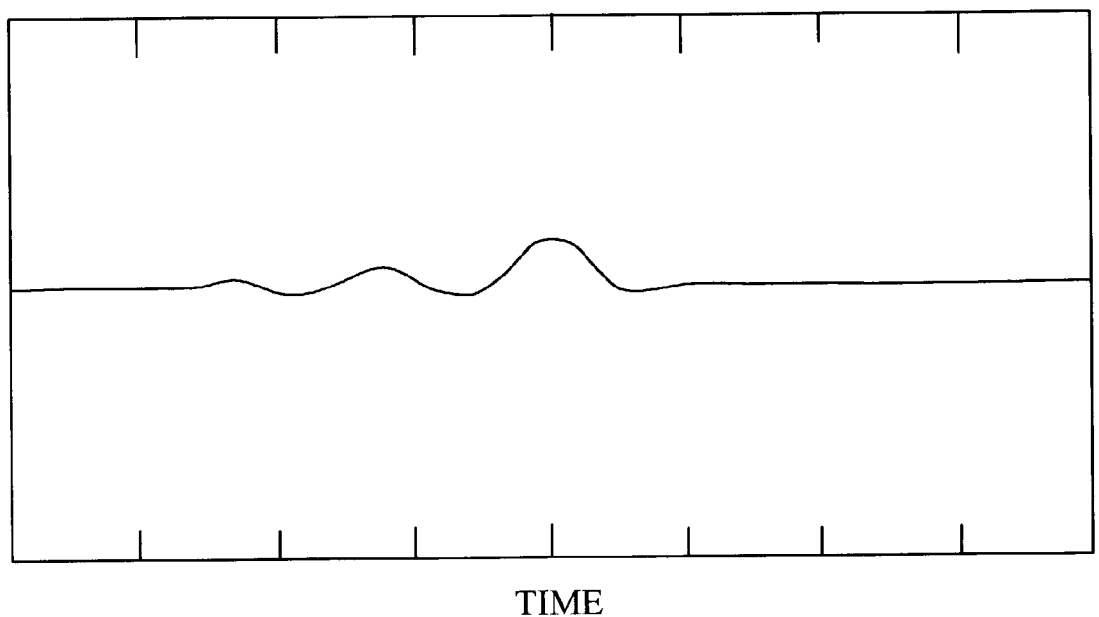
FIG. 15 is a waveform diagram showing the net effect of the transmission line losses of FIG. 14 as a weighted sum.

Transmission line effects on the $9^{th}$ orthogonal basis function of FIG. 14 (this is the lowermost of the basis functions, shown as the waveform closest to the bottom of the diagram) is shown in greater detail with reference to FIG. 15. Basically, the $9^{th}$ basis function represents a weighted sum of the remaining basis functions shown in FIG. 14.

Pursuant to a further embodiment of the invention, utilizing knowledge of transmission line effects entails using two different sets of basis functions: one for the transmitter, and one for the receiver. One set of basis functions can be fixed, whereas the other set of basis functions needs to be adapted to the particular electrical properties of the transmission line—for example resistance, capacitance, inductance, and conductance, and also to the distance between the transmitter and the receiver. The process of determining a suitable set of basis functions for adaptation to the specific electrical properties of a transmission line can be automated, and needs to be performed only once for a particular situation.

In order to determine the extent and nature of waveform degradations caused by transmission line propagation, the original basis functions may be utilized to construct a test signal at the transmitter. The transmitter transmits the test signal over a transmission line where, after degradation (i.e., after the signal is modified by the transmission line), the signal arrives at the receiver. The receiver measures the degraded test signal and uses this signal to define a set of basis functions that will be used at the receiver.

One of the most difficult facets of the entire transmission and receiving process is the reconstruction of a symbol sequence from the received signal. It simplifies matters considerably if the basis functions needed for decoding the signal are optimized for that purpose. This requires the basis functions to be known in advance. Therefore, it is the transmitter that should adapt to the transmission line, and generate signals that have a known shape after traversing the line. This process is possible because the transmission line equation is invertible.

Figure 16:
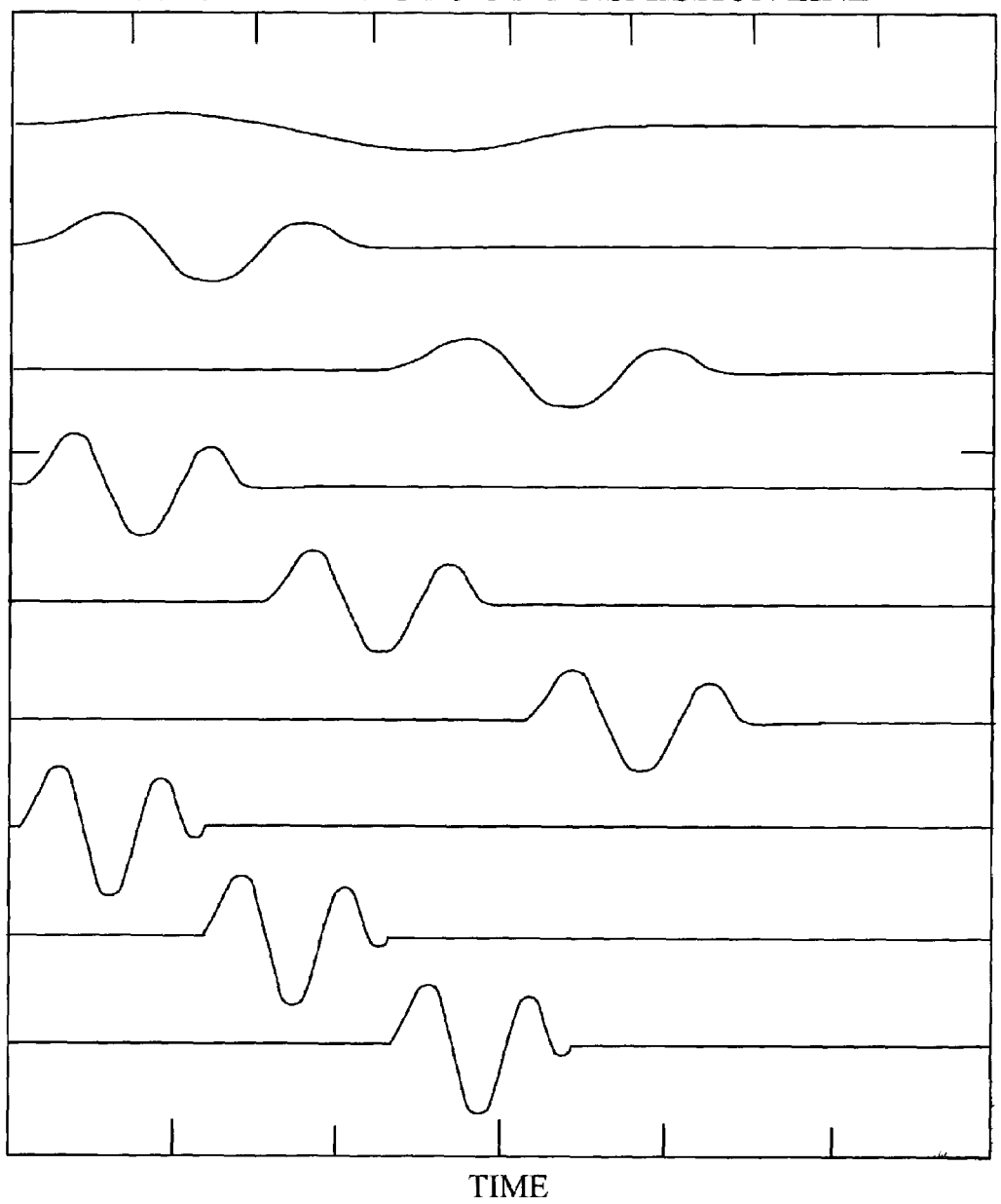
FIG. 16 is a waveform diagram setting forth nine illustrative pre-distorted smooth basis functions which have been predistorted to compensate for the effects of the transmission line losses depicted in FIGS. 14 and 15.

FIG. 16 is a waveform diagram setting forth nine illustrative pre-distorted smooth basis functions which have been pre-distorted to compensate for the effects of transmission line losses previously depicted with reference to FIGS. 14 and 15. Basically, FIG. 16 sets forth the waveforms (the signals) that need to be transmitted in order for the receiver to see smooth basis functions. The waveform diagram of FIG. 16 assumes the same basic transmission line parameters as were adopted in preparing FIGS. 14 and 15.

Figure 17:
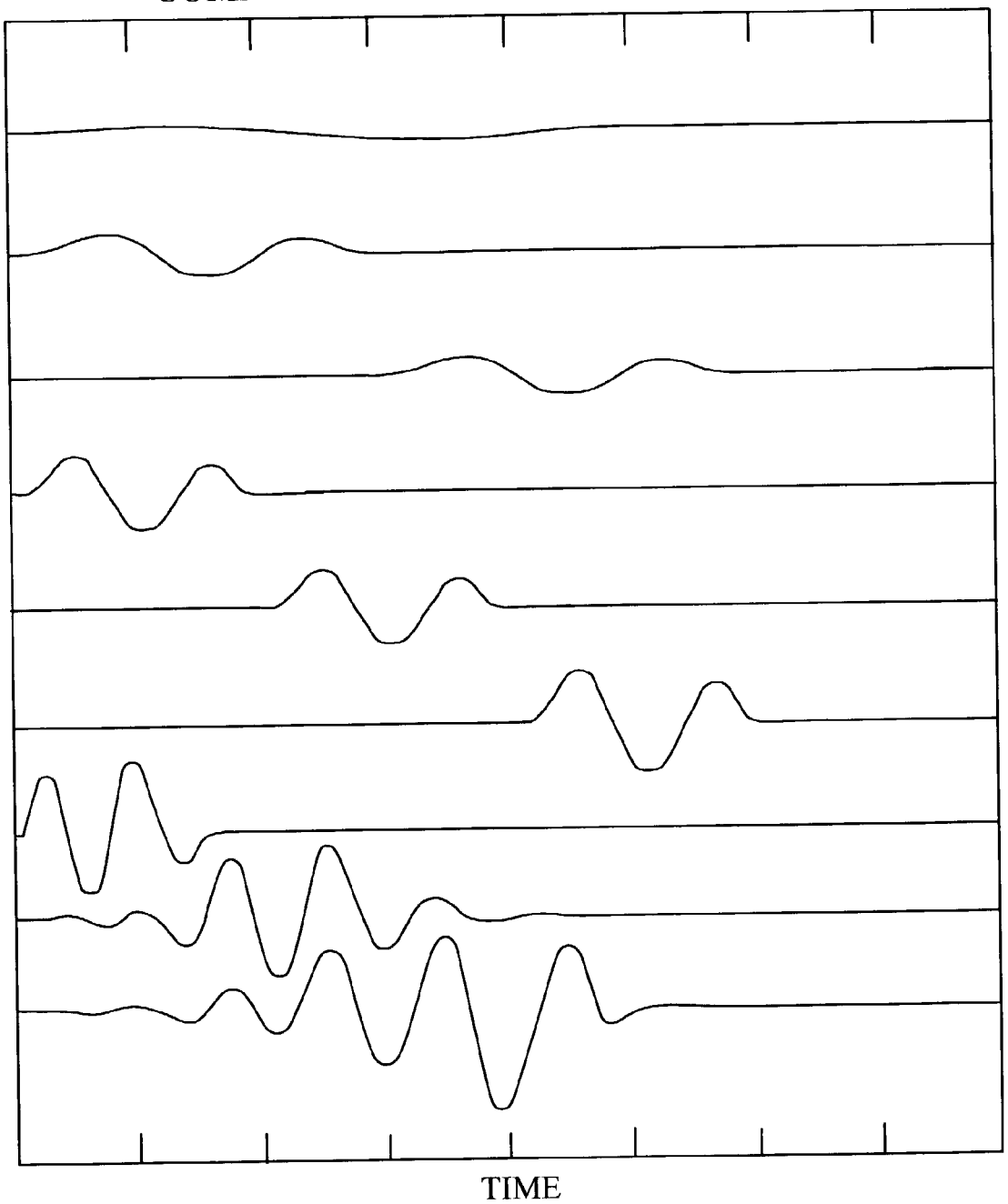
FIG. 17 is a waveform diagram setting forth nine illustrative pre-distorted orthogonal basis functions which have been predistorted to compensate for the effects of transmission line losses depicted in FIGS. 14 and 15.

In a similar fashion, the foregoing approach can be used to obtain signals that, when transmitted, become orthogonal basis functions at the receiving end. To this end, FIG. 17 is a waveform diagram setting forth nine illustrative pre-distorted orthogonal basis functions which have been pre-distorted to compensate for the effects of transmission line losses depicted in FIGS. 14 and 15. Pre-distorted orthogonal basis functions can be calculated either by computing weighted sums of the functions shown above, or by computing these "pre-distorted" functions from the orthogonal basis functions directly. The result is substantially the same, irrespective of which approach is adopted.

Figure 18:
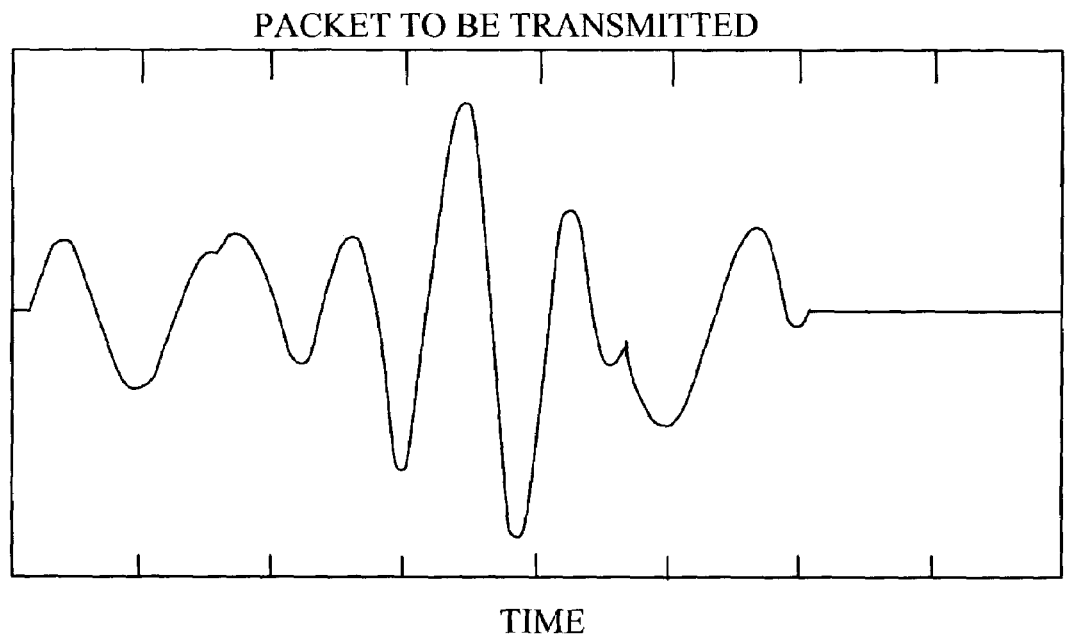
FIG. 18 is a waveform diagram setting forth a prime packet to be transmitted, based upon the pre-distorted orthogonal basis functions of FIG. 17.

Using the pre-distorted orthogonal basis functions depicted in FIG. 17, one can easily compute what the prime packet for the sequence of FIG. 4 should look like at the transmitter. The "pre-distorted" prime packet for this sequence is shown in FIG. 18, which is a waveform diagram setting forth a prime packet to be transmitted, based upon the pre-distorted orthogonal basis functions of FIG. 17. At the receiver, this sequence looks like the prime packet waveform shown in FIG. 13.

The foregoing embodiments of the invention may be utilized to increase the information transmission capacity (i.e. the effective bandwidth) of existing transmission media, irrespective of whether these media involve wireless communication, wired communication, fiber-optic communication, or various combinations thereof. For example, the techniques of the invention may be utilized in conjunction with satellite transmission protocols. No other known multiplexing method uses a plurality of prime number frequencies to represent information. Additionally, predistorting a signal to obtain a specific waveform at the receiver (as opposed to obtaining a desired energy distribution over a range of frequencies) is a novel approach.

Prime frequency encoding can be applied to a single channel, and/or, to a plurality of independent information streams. Moreover, the techniques of the present invention may be applied to virtually any analog or digital transmission protocol, including DSL (Digital Subscriber Loop). The invention may be applied to any medium capable of carrying electronically-coded analog and/or digital information. The invention has particular value when applied in the context of analog representation of digital data. For example, a typical computer hard disk inherently deals with analog storage of data bits. In addition, the invention can be utilized in situations where large number of unique voice and data channels need to be conveyed on a single communications path, such as a wire pair or a single radio channel. Basically, the invention provides a feasible means for increasing the effective bandwidth of a communications link.

While various preferred embodiments of systems and methods of communicating information using prime frequency basis functions have been described, it is to be clearly understood that many changes may be made therein without departing from the spirit and scope of the invention. Thus, the foregoing systems and methods can be applied not only to the communication of digital or analog information, but also to information storage in which a plurality of digital or analog information streams in the form of disharmonic chords are stored in a CD ROM, computer-readable data storage medium, or other storage medium. The foregoing systems and methods can also be advantageously combined with existing techniques, such as DSL (digital subscriber loop), although such combination is not required.

I claim:

1. A system for enhancing effective data throughput of a communications link and comprising: (a) a transformation mechanism for transforming an incoming stream of digitally represented information into a prime frequency information stream that includes a plurality of prime frequency components, wherein the transformation is accomplished through the use of a plurality of waveforms characterized by basis functions, wherein the transformation mechanism is adapted to transform a plurality of incoming digital bit streams carried on one or more incoming channels in the form of binary bits, and wherein the transformation mechanism maps each of respective incoming binary bits to a corresponding one of a group of waveforms via a serial-to-parallel data conversion mechanism, which are then combined to provide a composite waveform information stream; and (b) a transmitter for transmitting the prime frequency information stream over the communications link.

2. The system of claim 1 wherein the transformation mechanism converts the digital bits into a plurality of individual prime frequency component streams which are then combined to provide a composite prime frequency information stream.

3. The system of claim 1 wherein the transformation mechanism maps each of respective incoming digital bits to a corresponding one of a group of waveforms.

4. The system of claim 1 wherein the transformation mechanism maps each of respective incoming digital bits to a waveform.

5. The system of claim 1 wherein the transformation mechanism uses the serial-to-parallel data conversion mechanism in conjunction with a group of waveforms, such that a first incoming bit is mapped to a first waveform and a second incoming bit is mapped to a second waveform.

6. The system of claim 5 wherein the transformation mechanism uses the serial-to-parallel data conversion mechanism in conjunction with a group of N waveforms characterized by N basis function, wherein N is a positive integer greater than one, such that a first incoming bit is mapped to a first waveform and a second incoming bit is mapped to a second waveform.

7. The system of claim 6 wherein, if an incoming bit is a "1", "on", or "high" bit, this enables a corresponding waveform to which this incoming bit is mapped, whereas if the bit is a "0", "off", or "low" bit, this disables the corresponding waveform.

8. The system of claim 6 wherein each predetermined waveform is characterized by a specific prime frequency component, and each predetermined waveform lasts for a specified length of time, wherein, due to the fact that each basis function corresponds to a unique prime frequency component, each such frequency component is rendered distinctive and substantially non-interfering with respect to every other prime frequency component.

9. The system of claim 8 wherein all or a portion of a communications link is provided in the form of a single transmission medium.

10. The system of claim 6 wherein each predetermined waveform is characterized by a group of frequency components within a predefined range, and each predetermined waveform lasts for a specified length of time, wherein, due to the fact that each basis function corresponds to a unique group of frequency components, each such group of frequency components is rendered distinctive and non-interfering with respect to every other group of frequency components.

11. The system of claim 6 wherein each basis function in the group of N basis functions is mutually orthogonal with respect to all other basis functions in the group of N basis functions.

12. The system of claim 11 wherein at least one mutually orthogonal basis function is mathematically smoothed to reduce sharp changes in amplitude.

13. The system of claim 6 wherein each basis function in the group of N basis function is mathematically "smoothed" to reduce sharp charges in the amplitude of the waveform as a function of time.

14. The system of claim 6 further comprising a receiver equipped with a frequency-selective filtering mechanism for separating information carried by a first prime number frequency component from information carried by other prime frequency components and for separating information carried by a second prime number frequency components, so as to provide separation of each of a plurality of prime frequency component, information streams.

15. The system of claim 1 wherein the transformation mechanism uses the serial to-parallel data conversion mechanism in conjunction with a group of N waveforms characterized by N basis functions, such that a first incoming bit is mapped to a first waveform, a second incoming bit is mapped to a second waveform, and so on, until the Nth waveform is reached, whereupon the process cycles back to the first waveform, wherein N is a positive integer.

16. The system of claim 1 wherein the transformation mechanism uses the serial-to-parallel data conversion mechanism in conjunction with a group of N waveforms characterized by N basis functions, such that a first incoming bit is mapped to a first waveform, a second incoming bit is mapped to a second waveform, and so on, using an incoming bit-to-waveform mapping table.

17. The system of claim 1 wherein the transformation mechanism uses the serial to-parallel data conversion mechanism in conjunction with a group of N waveforms characterized by N basis functions, such that a first incoming digital symbol is mapped to a first waveform, a second incoming digital symbol is mapped to a second waveform, and so on, until the Nth waveform is reached, whereupon the process cycles back to the first waveform, wherein N is a positive integer.

18. The system of claim 17 wherein each incoming digital symbol has a value, and the value is used to amplitude-modulate a corresponding waveform to which this incoming digital symbol is mapped.

19. The system of claim 1 further including a receiving mechanism for receiving the prime frequency components from a communications link.

20. A method for enhancing effective data throughput of a communications link, the method including the steps of:
(a) transforming an incoming stream of digitally represented information comprising a plurality of digital bit streams carried on one or more incoming channels in the form of binary bits into a prime frequency information stream that includes a plurality of prime frequency components, wherein the transformation is accomplished through the use of a plurality of waveforms characterized by basis functions, by mapping via a serial-to-parallel data conversion mechanism the digital bits into a plurality of individual prime freciuency component streams, wherein said mapping maps each of respective incoming digital bits to a corresponding one of a group of waveforms, the waveforms being characterized by basis functions; and (b) transmitting the prime frequency information stream over the communications link.

21. The method of claim 20 further including the step of combining the plurality of individual prime frequency component streams to provide a composite prime frequency information stream.

22. The method of claim 20 wherein the step of mapping maps each of respective incoming digital bits to a corresponding one of a group of waveforms.

23. The method of claim 22 wherein the step of mapping utilizes a group of N waveforms, wherein a first incoming bit is mapped to a first waveform, a second incoming bit is mapped to a second waveform, and so on, until the Nth waveform is reached, whereupon mapping cycles back to the first waveform, and wherein N is a positive integer.

24. The method of claim 20 wherein the step of mapping utilizes a group of at least two waveforms, wherein a first incoming bit is mapped to a first waveform, and a second incoming bit is mapped to a second waveform.

25. The method of claim 22 wherein the step of mapping utilizes a group of N waveforms, wherein a first incoming bit is mapped to a first waveform, a second incoming bit is mapped to a second waveform, and so on, using an incoming bit to waveform mapping table, and wherein N is a positive integer.

26. The method of claim 20 wherein a group of N basis functions are used, N being a positive integer greater than one, and each basis function in the group of N basis functions is mutually orthogonal with respect to all other basis functions in the group.

27. The method of claim 26 wherein the N orthogonal basis functions are mathematically "smoothed" to reduce sharp charges in the amplitude of the waveform as a function of time.

28. The method of claim 20 wherein the N basis functions are mathematically "smoothed" to reduce sharp changes in the amplitude of the waveform as a function of time.

29. The method of claim 20 further comprising the steps of separating information carried by a first prime number frequency component from information carried by other prime number frequency components, and separating information carried by a second prime number frequency component stream from information carried by other prime number frequency components.

30. A method for enhancing effective data throughput of a communications link, the method including the steps of:
accepting a plurality of incoming digital information streams carried on one or more incoming channels in the form of digital symbols;
transforming the incoming digital information streams into a prime frequeney information stream that includes a plurality of prime frequency components, by converting the digital symbols into a plurality of individual prime frequency component streams, the step of converting performed by mapping, via a serial-to-parallel data conversion mechanism, each of respective incoming digital symbols to a corresponding one of a group of waveforms characterized by basis functions; and (b) transmitting the prime frequency information stream over the communications link.

31. The method of claim 30 wherein the digital symbols each have a corresponding symbol value, and the symbol value is used to amplitude-modulate a corresponding prime frequency component stream.

32. The method of claim 30 further including the step of combining the plurality of individual prime frequency component streams to provide a composite prime frequency information stream.

33. The method of claim 30 wherein the step of mapping utilizes a group of N waveforms and N basis functions, wherein a first incoming bit is mapped to a first waveform, a second incoming bit is mapped to a second waveform, and so on, until the Nth waveform is reached, whereupon mapping cycles back to the first waveform, and wherein N is a positive integer.

34. The method of claim 33 further including the step of adjusting the amplitude of a corresponding waveform to which an incoming symbol is mapped, based upon the value of the incoming symbol.

35. The method of claim 34 wherein each predetermined waveform is characterized by a specific prime frequency component, and each predetermined waveform lasts for a specified length of time, whereby, due to the fact that each basis function corresponds to a unique prime frequency component, each such frequency component is rendered distinctive and substantially non-interfering with respect to every other prime frequency component.

36. The method of claim 34 further including the step of receiving the prime frequency components from a communications link.

37. The method of claim 36 further including the step of decoding the received prime frequency components.

38. The method of claim 37 wherein the step of decoding includes the step of determining appropriate weighting factors to be applied to each of a plurality of prime frequency components.

39. The method of claim 38 wherein the step of decoding includes the step of using the weighting factors to recover a plurality of corresponding symbol values.

40. The method of claim 30 wherein the step of mapping utilizes a group of N waveforms, wherein a first incoming bit is mapped to a first waveform, a second incoming bit is mapped to a second waveform, and so on, using an incoming bit to waveform mapping table, and wherein N is a positive integer.

41. The method of claim 40 further including the step of adjusting the amplitude of a corresponding waveform to which an incoming symbol is mapped, based upon the value of the incoming symbol.

42. The method of claim 41 wherein each predetermined waveform is characterized by a specific prime frequency component, and each predetermined waveform lasts for a specified length of time, whereby, due to the fact that each basis function corresponds to a unique prime frequency component, each such frequency component is rendered distinctive and non-interfering with respect to every other prime frequency component.

43. The method of claim 41 further including the step of receiving the prime frequency components from a communications link.

44. The method of claim 43 further including the step of decoding the received prime frequency components.

45. The method of claim 44 wherein the step of decoding includes the step of determining appropriate weighting factors to be applied to each of a plurality of prime frequency components.

46. The method of claim 45 wherein the step of decoding includes the step of using the weighting factors to recover a plurality of corresponding symbol values.

47. The method of claim 30 further including the step of providing all or a portion of a communications link in the form of a single transmission medium.

* * * * *